(12) United States Patent
Holzheimer et al.

(10) Patent No.: US 8,377,177 B2
(45) Date of Patent: Feb. 19, 2013

(54) METHOD FOR SUPPLYING AUXILIARY MATERIAL AND RECEPTACLE FOR AUXILIARY MATERIAL

(75) Inventors: Jens Holzheimer, Tamm (DE); Dietmar Wieland, Waiblingen (DE)

(73) Assignee: Durr Systems GmbH, Bietigheim-Bissingen (DE)

( * ) Notice: Subject to any disclaimer, the term of this patent is extended or adjusted under 35 U.S.C. 154(b) by 242 days.

(21) Appl. No.: 12/711,799

(22) Filed: Feb. 24, 2010

(65) Prior Publication Data
US 2010/0199912 A1 Aug. 12, 2010

Related U.S. Application Data

(63) Continuation of application No. PCT/EP2008/005483, filed on Jul. 4, 2008.

(30) Foreign Application Priority Data

Aug. 24, 2007 (DE) .................. 10 2007 040 899

(51) Int. Cl.
*B01D 46/00* (2006.01)
(52) U.S. Cl. ....... 95/285; 55/524; 55/DIG. 46; 118/326; 96/373
(58) Field of Classification Search ............. 55/385.2, 55/422, 482, 524, DIG. 46, 308, 318, 339; 95/267, 280, 285, 287, 23, 108; 96/372, 96/373, 150, 156, 157, 174, 134; 118/309, 118/326, 300, 610, 712; 427/300, 8, 401, 427/426; 454/53, 55, 50, 10, 54; 423/210
See application file for complete search history.

(56) References Cited

U.S. PATENT DOCUMENTS

| | | | |
|---|---|---|---|
| 4,094,654 A | 6/1978 | Prinzing | |
| 4,417,541 A | 11/1983 | Schäfer | |
| 5,020,470 A | 6/1991 | West et al. | |
| 5,591,240 A | 1/1997 | Ophardt et al. | |
| 5,782,943 A * | 7/1998 | O'Ryan et al. | 55/332 |
| 6,010,571 A * | 1/2000 | Josefsson et al. | 118/326 |

(Continued)

FOREIGN PATENT DOCUMENTS

| DE | 70 14 433 U1 | 4/1970 |
|---|---|---|
| DE | 24 49 065 A1 | 4/1976 |

(Continued)

OTHER PUBLICATIONS

Examination Report for DE 10 205 013 711.3 dated Nov. 10, 2005.

(Continued)

*Primary Examiner* — Duane Smith
*Assistant Examiner* — Minh-Chau Pham
(74) *Attorney, Agent, or Firm* — Leydig, Voit & Mayer, Ltd.

(57) ABSTRACT

In order to provide a method for supplying fresh auxiliary material, which is added to a stream (120) of crude gas laden with wet paint overspray before the stream of crude gas passes through at least one filter element (172) for separating the overspray from the steam of crude gas, to at least one filter device (132) which comprises at least one receptacle (176) for auxiliary material, which is in its operating position, while the stream of crude gas is passing through the filter element, which method enables better action of the auxiliary material on the stream of crude gas and makes a particularly efficient supply of fresh auxiliary material to the at least one filter device possible, it is suggested that the fresh auxiliary material be supplied directly into the receptacle for auxiliary material while the receptacle for auxiliary material is in the operating position.

14 Claims, 24 Drawing Sheets

U.S. PATENT DOCUMENTS

| | | | |
|---|---|---|---|
| 6,471,737 B2 * | 10/2002 | Cole et al. | 55/385.2 |
| 6,663,693 B2 * | 12/2003 | Fenik | 95/271 |
| 6,723,145 B2 * | 4/2004 | Cole | 55/342 |
| 6,723,169 B2 * | 4/2004 | Hihn et al. | 118/309 |
| 6,752,854 B1 * | 6/2004 | Varone et al. | 95/216 |
| 7,959,722 B2 * | 6/2011 | Wieland et al. | 96/372 |
| 7,988,769 B2 * | 8/2011 | Wieland et al. | 95/267 |
| 2002/0020347 A1 | 2/2002 | Gerlain | |
| 2005/0019106 A1 | 1/2005 | Moser | |
| 2005/0095071 A1 | 5/2005 | Kleineidam et al. | |
| 2008/0179121 A1 * | 7/2008 | Sauvlet et al. | 180/65.2 |
| 2008/0229925 A1 | 9/2008 | Wieland et al. | |
| 2008/0229926 A1 | 9/2008 | Wieland et al. | |
| 2009/0209188 A1 * | 8/2009 | Wieland et al. | 454/54 |
| 2011/0059258 A1 * | 3/2011 | Fritz et al. | 427/426 |
| 2011/0262324 A1 * | 10/2011 | Fritz et al. | 423/210 |
| 2011/0274827 A1 * | 11/2011 | Fritz et al. | 427/8 |

FOREIGN PATENT DOCUMENTS

| | | |
|---|---|---|
| DE | 81 15 387 U1 | 12/1981 |
| DE | 39 25 818 A1 | 2/1991 |
| DE | 42 11 465 A1 | 10/1993 |
| DE | 43 03 753 A1 | 8/1994 |
| DE | 196 10 566 A1 | 9/1994 |
| DE | 295 08 187 U1 | 7/1995 |
| DE | 694 04 175 T2 | 10/1997 |
| DE | 197 36 331 A1 | 10/1998 |
| DE | 695 04 511 T2 | 5/1999 |
| DE | 299 07 779 U1 | 7/1999 |
| DE | 100 28 553 A1 | 12/2001 |
| DE | 101 09 574 C2 | 9/2002 |
| DE | 101 30 173 A1 | 1/2003 |
| DE | 197 05 523 C2 | 1/2003 |
| DE | 202 18 192 U1 | 3/2003 |
| DE | 202 20 435 U1 | 7/2003 |
| DE | 103 41 979 A1 | 3/2005 |
| DE | 103 50 332 A1 | 5/2005 |
| DE | 103 61 266 A1 | 7/2005 |
| DE | 199 24 130 B4 | 8/2005 |
| DE | 10 2005 048 579 A1 | 4/2007 |
| EP | 0 415 511 A1 | 3/1991 |
| EP | 0 761 577 A1 | 3/1997 |
| EP | 1 512 465 A1 | 3/2005 |
| EP | 1 427 536 B1 | 8/2005 |
| EP | 1 704 925 A2 | 9/2006 |
| EP | 1 704 926 A2 | 9/2006 |
| GB | 2 035 834 A | 6/1980 |
| JP | 49-047227 A | 11/1975 |
| JP | 52-020524 A | 5/1977 |
| JP | 53-109274 A | 9/1978 |
| JP | 56-048263 A | 5/1981 |
| JP | 59-206075 A | 11/1984 |
| JP | 02-123025 A | 5/1990 |
| JP | 06-278868 A | 10/1994 |
| JP | 07-037311 U | 7/1995 |
| JP | 10-296026 A | 11/1998 |
| JP | 2008-536661 T | 9/2008 |
| WO | WO 03/024612 A1 | 3/2003 |
| WO | WO 2004/087331 A1 | 10/2004 |
| WO | WO 2006/099999 A1 | 9/2006 |
| WO | WO 2006/100001 A1 | 9/2006 |
| WO | WO 2007/039275 A1 | 4/2007 |
| WO | WO 2007/039276 A1 | 4/2007 |
| WO | WO 2009/026986 A1 | 3/2009 |

OTHER PUBLICATIONS

Examination Report for DE 10 2005 048 579.0 dated Mar. 15, 2006.
Examination Report for DE 10 2005 048 580.4 dated Mar. 15, 2006.
International Search Report dated Nov. 3, 2008 for PCT/EP2008/005483.

* cited by examiner

METHOD FOR SUPPLYING AUXILIARY MATERIAL AND RECEPTACLE FOR AUXILIARY MATERIAL This application is a continuation of international application number PCT/EP2008/005483 filed on Jul. 4, 2008.

The present disclosure relates to the subject matter disclosed in international application number PCT/EP2008/005483 of Jul. 4, 2008 and German application number 10 2007 040 899.6 of Aug. 24, 2007, which are incorporated herein by reference in their entirety and for all purposes.

BACKGROUND OF THE INVENTION

The present invention relates to a method for supplying fresh auxiliary material, which is added to a stream of crude gas laden with wet paint overspray before the stream of crude gas passes through at least one filter element for separating the overspray from the stream of crude gas, to at least one filter device which comprises at least one receptacle for auxiliary material, which is in an operating position, while the stream of crude gas is passing through the filter element.

Such a method is known, for example, from DE 10 2005 048 579 A1.

With this known method, the dry separation of the wet paint overspray from the stream of crude gas of a spray booth takes place in the filter device once fresh, flowable, particulate auxiliary material designated as "precoat" material has been released into the stream of crude gas with a nozzle arrangement.

This auxiliary material serves the purpose of being deposited on the surfaces of the filter element as a barrier layer in order to prevent these surfaces from becoming clogged due to overspray particles adhering thereto. As a result of periodic cleaning of the filter elements of the filter device, the mixture consisting of auxiliary material and wet paint overspray passes from the filter elements into receptacles for auxiliary material, from which it can be withdrawn by suction in order to be supplied to the nozzle arrangement for renewed use as auxiliary material. Furthermore, the mixture consisting of auxiliary material and wet paint overspray which is present in the receptacle for auxiliary material can be whirled up by means of pulses of compressed air from a compressed air lance in order to rise up out of the receptacle for auxiliary material to the filter elements and be deposited on them.

In order to prevent auxiliary material passing into the application area of the paint plant while auxiliary material is being supplied to the stream of crude gas from the nozzle arrangement, the flow path of the stream of crude gas from the application area to the filter device is closed periodically in this known method. The auxiliary material which has been whirled up from the receptacles for auxiliary material is not sufficient to generate an adequate protection layer on the filter elements. In addition, fresh auxiliary material can be introduced into the stream of crude gas only through the nozzle arrangement.

The object underlying the present invention is to provide a method of the type specified at the outset which enables better action of the auxiliary material on the stream of crude gas and makes a particularly efficient supply of fresh auxiliary material to the at least one filter device possible.

SUMMARY OF THE INVENTION

This object is accomplished in accordance with the invention, in a method described herein, in that the fresh auxiliary material is supplied directly into the receptacle for auxiliary material while the receptacle for auxiliary material is in the operating position.

The receptacle for auxiliary material is preferably arranged in the operating position beneath at least one filter element such that the mixture consisting of auxiliary material and wet paint overspray which is cleaned from the filter element passes downwards into the receptacle for auxiliary material during the cleaning.

Furthermore, it is preferably provided for the fresh auxiliary material from the receptacle for auxiliary material to pass directly into the stream of crude gas.

For this purpose, it is particularly favorable when the stream of crude gas is conveyed through the receptacle for auxiliary material.

The incorporation of the auxiliary material from the receptacle for auxiliary material into the stream of crude gas can be improved when the auxiliary material is whirled up in the receptacle for auxiliary material by means of a whirling device.

The solution according to the invention offers the advantage that a nozzle arrangement for the supply of fresh auxiliary material to the filter device can be dispensed with. As a result, it is also not necessary to close the flow path of the stream of crude gas from the application area to the filter device periodically in order to prevent auxiliary material reaching the application area.

In one preferred development of the invention, it is provided for the at least one receptacle for auxiliary material to be mounted in the operating position so as to be immovable.

As a result, the receptacle for auxiliary material, together with boundary walls of the filter device, can form an air-tight unit which ensures a dust-free handling of the particulate materials (auxiliary material and wet paint overspray).

In addition, the receptacle for auxiliary material need not be disconnected from other boundary walls of the filter device in order to supply fresh auxiliary material to the receptacle for auxiliary material. As a result, contamination of the surroundings, which could be caused by the exiting of dust during the disconnection of the receptacle for auxiliary material from adjoining boundary walls, will be avoided.

Furthermore, a receptacle for auxiliary material which is mounted in the operating position so as to be immovable is particularly easy to produce.

In one preferred development of the invention, it is provided for the auxiliary material to be supplied to the receptacle for auxiliary material through a supply line for auxiliary material which is connected to the receptacle for auxiliary material.

In this respect, it may be provided, in particular, for the supply line for auxiliary material to comprise a flexible hose line.

The fresh auxiliary material will preferably be conveyed into the at least one receptacle for auxiliary material from at least one storage receptacle.

This conveyance can be brought about by means of a so-called blow pot or a powder metering pump, for example, a so-called DDF pump or another metering pump conveying with suction/pressure alternation in accordance with the principle of a dense flow. Powdered substances are conveyed in a particularly gentle and exactly meterable manner over relatively large distances by means of such pumps, in particular DDF pumps.

Blow pots are known per se, for example, from JP 02123025 A or JP 06278868 A and have, up to now, been used in coating plants for the purpose of conveying powdered paint to the application receptacles located in the vicinity of the sprayers. The receptacles are relatively small, closable containers with a base permeable to air, through which air can be conveyed into the receptacle for the fluidization of the powder and for its conveyance.

In order to make room in the receptacle for auxiliary material for fresh auxiliary material, it may be provided for auxiliary material mixed with overspray to be removed from the at least one receptacle for auxiliary material through a discharge line for auxiliary material which is connected to the receptacle for auxiliary material.

In this respect, it is favorable for an efficient and as complete an emptying of the receptacle for auxiliary material as possible when at least one discharge line for auxiliary material opens into an interior space of the receptacle for auxiliary material in a corner area of the receptacle for auxiliary material.

It is particularly favorable for a complete emptying when at least two discharge lines for auxiliary material open into an interior space of the receptacle for auxiliary material, preferably in corner areas of the receptacle for auxiliary material which are different to one another.

The auxiliary material mixed with overspray from the at least one receptacle for auxiliary material is preferably conveyed into a collecting receptacle, from where it is supplied for reuse, further processing or waste disposal.

It has proven to be particularly favorable when the auxiliary material mixed with overspray is drawn out of the at least one receptacle for auxiliary material by suction.

Auxiliary material mixed with overspray is preferably removed from at least one receptacle for auxiliary material in order to empty the receptacle for auxiliary material before fresh auxiliary material is supplied to the receptacle for auxiliary material. In this way, it is possible to prevent overspray still located in the receptacle for auxiliary material from degrading the quality of the fresh auxiliary material supplied.

The auxiliary material mixed with overspray can be removed from at least one receptacle for auxiliary material when the auxiliary material in the relevant receptacle for auxiliary material reaches a predetermined filling level.

This filling level of the auxiliary material can be measured, in particular, by means of a filling level sensor arranged in the receptacle for auxiliary material, whereby a particularly reliable control of the emptying of the respective receptacle for auxiliary material is made possible.

As a result of the accumulation of wet paint overspray, which has a lower density than the auxiliary material, in the mixture consisting of auxiliary material and overspray which is present in the receptacle for auxiliary material, the density of this mixture decreases during operation of the filter device ever further and so the barrier layer which is built up on the at least one filter element of the filter device has an ever greater volume.

The filling level of the material in the receptacle for auxiliary material therefore decreases ever further immediately prior to a cleaning procedure of the filter element.

It may, therefore, be provided for auxiliary material mixed with overspray to be removed from at least one receptacle for auxiliary material when the filling level of the auxiliary material in the receptacle for auxiliary material has been reduced to a predetermined minimum filling level, for example, approximately 10% of the capacity of the receptacle for auxiliary material.

Alternatively hereto, the filling level of the material in the receptacle for auxiliary material can be measured after each cleaning procedure of the at least one filter element of the filter device and auxiliary material mixed with overspray removed from at least one receptacle for auxiliary material when the filling level of the auxiliary material in the receptacle for auxiliary material has risen to a predetermined maximum filling level, for example, 90% of the maximum capacity of the receptacle for auxiliary material.

It can, in particular, also be provided for at least one filter element associated with a receptacle for auxiliary material to be cleaned and auxiliary material mixed with overspray to be removed from the receptacle for auxiliary material when the filling level of the auxiliary material in the receptacle for auxiliary material, which has risen as a result of cleaning, has reached a predetermined maximum filling level.

In order to facilitate the removal of the auxiliary material mixed with overspray from the receptacle for auxiliary material, it is favorable when the auxiliary material mixed with overspray is fluidized in at least one receptacle for auxiliary material while auxiliary material mixed with overspray is being removed from the receptacle for auxiliary material.

Alternatively or in addition hereto, the withdrawal of the used material from the receptacle for auxiliary material by suction can be aided by the fact that the auxiliary material in at least one receptacle for auxiliary material is whirled up at least periodically by means of a whirling device while auxiliary material mixed with overspray is being removed from the receptacle for auxiliary material. The material to be removed will be loosened by the whirling up and moved to the inlet openings of the discharge lines.

The present invention relates, in addition, to a receptacle for auxiliary material for accommodating an auxiliary material which is added to a stream of crude gas laden with wet paint overspray before the steam of crude gas passes through at least one filter element for separating the overspray from the stream of crude gas while the receptacle for auxiliary material is in an operating position.

The object underlying the present invention is to provide such a receptacle for auxiliary material, to which fresh auxiliary material can be supplied in a simple and efficient manner without such auxiliary material reaching the application area of a paint plant.

This object is accomplished in accordance with the invention, in that the receptacle for auxiliary material is connected to a supply device for auxiliary material for supplying fresh auxiliary material directly into the receptacle for auxiliary material which is in an operating position.

Special developments of the receptacle for auxiliary material according to the invention are also described herein with respect to additional features and advantages.

The receptacle for auxiliary material according to the invention is suitable, in particular, for use in a device for separating wet paint overspray from a stream of crude gas containing overspray particles which comprises at least one filter element for separating the overspray from the stream of crude gas and at least one receptacle for auxiliary material according to the invention.

Special developments of such a device for separating wet paint overspray according to the invention are also described herein with respect to additional features and advantages.

The device according to the invention for separating wet paint overspray is suitable, in particular, for use in a plant for painting objects, in particular vehicle bodies, which comprises at least one application area for applying wet paint to the objects to be painted and at least one device according to the invention for separating wet paint overspray.

The invention is suitable, in particular, for use in a dry separation system for wet paint overspray for painting booths in the automobile industry or, in general, in the field of industrial paint plants.

Additional features and advantages of the invention are the subject matter of the following description and the drawings illustrating embodiments.

DETAILED DESCRIPTION OF THE INVENTION

Figure 1:
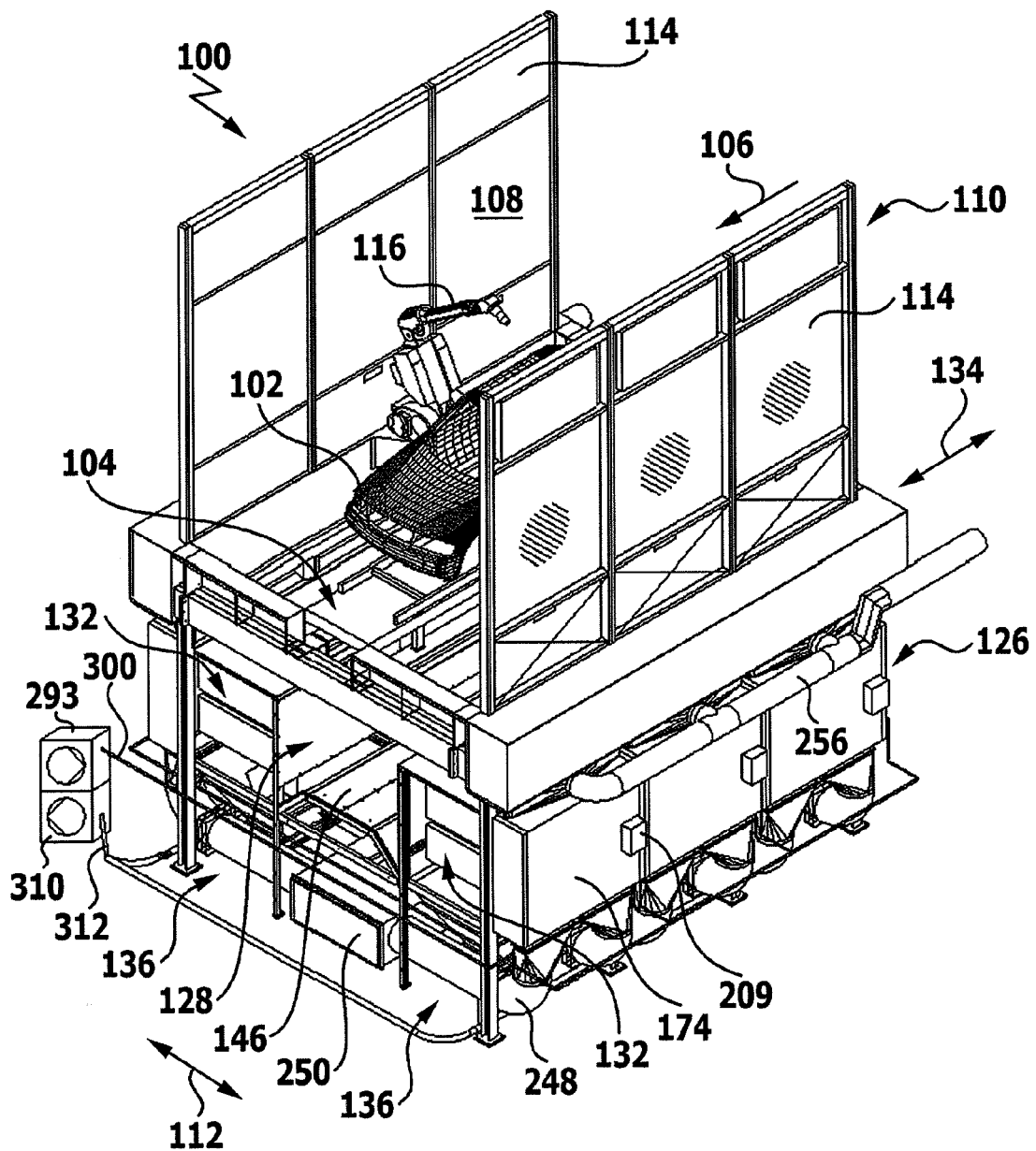
FIG. 1 shows a schematic perspective illustration of a painting booth with a device arranged under it for separating wet paint overspray from a stream of crude gas containing overspray particles, the device comprising a flow chamber arranged beneath the painting booth and three filter modules arranged on each side of the flow chamber.

The same or functionally equivalent elements are designated in all the Figures with the same reference numerals.

A plant for the spray painting of vehicle bodies 102, which is illustrated in FIGS. 1 to 19 and designated as a whole as 100, comprises a conveying device 104 which is illustrated purely schematically and by means of which the vehicle bodies 102 can be moved along a direction 106 of conveyance through an application area 108 of a painting booth designated as a whole as 110.

The application area 108 is the interior space of the painting booth 110 which is delimited by a respective booth wall 114 on both sides of the conveying device 104 in a horizontal transverse direction 112 which extends at right angles to the direction 106 of conveyance which corresponds to the longitudinal direction of the painting booth 110.

Spray painting devices 116, for example, in the form of painting robots are arranged on both sides of the conveying device 104 in the painting booth 110.

Figure 3:
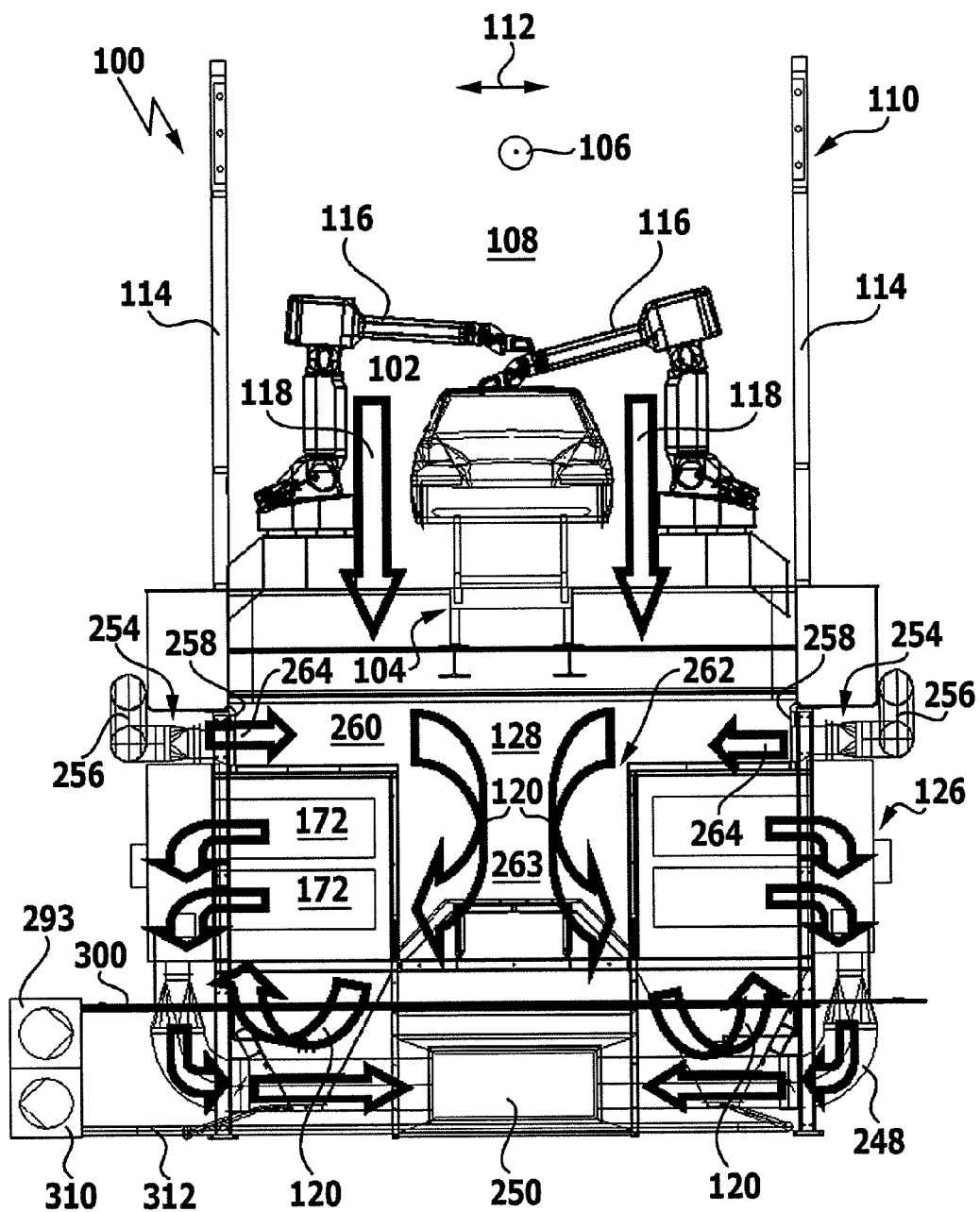
FIG. 3 shows a schematic vertical cross section corresponding to FIG. 2 through the plant from FIG. 1, wherein the respective flow directions of the crude gas, the exhaust air exiting from the filter modules and the incoming air fed into the flow chamber for generating transverse curtains of air are indicated, in addition, by arrows.
Figure 4:
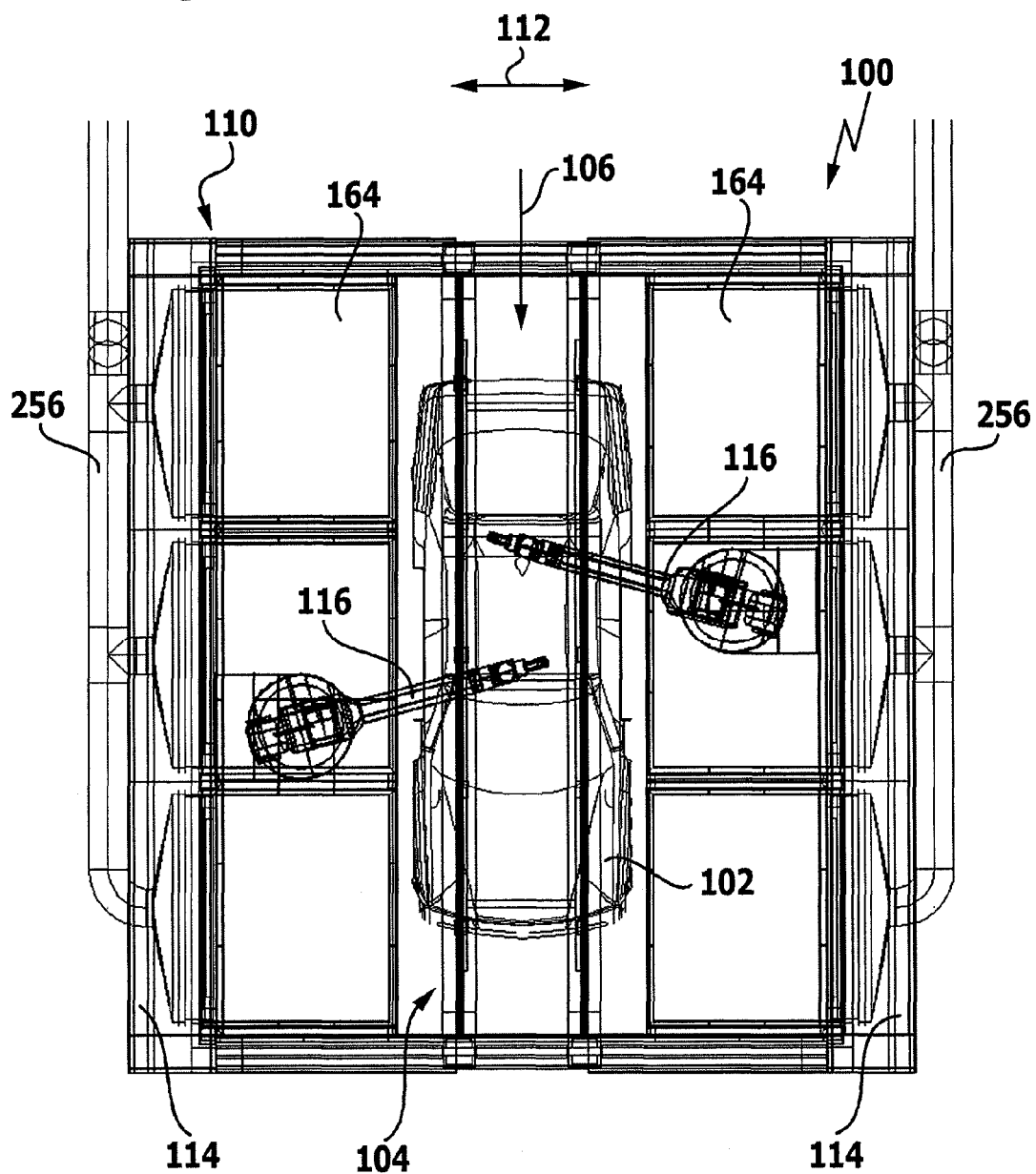
FIG. 4 shows a schematic plan view from above of the plant from FIGS. 1 to 3.
Figure 5:
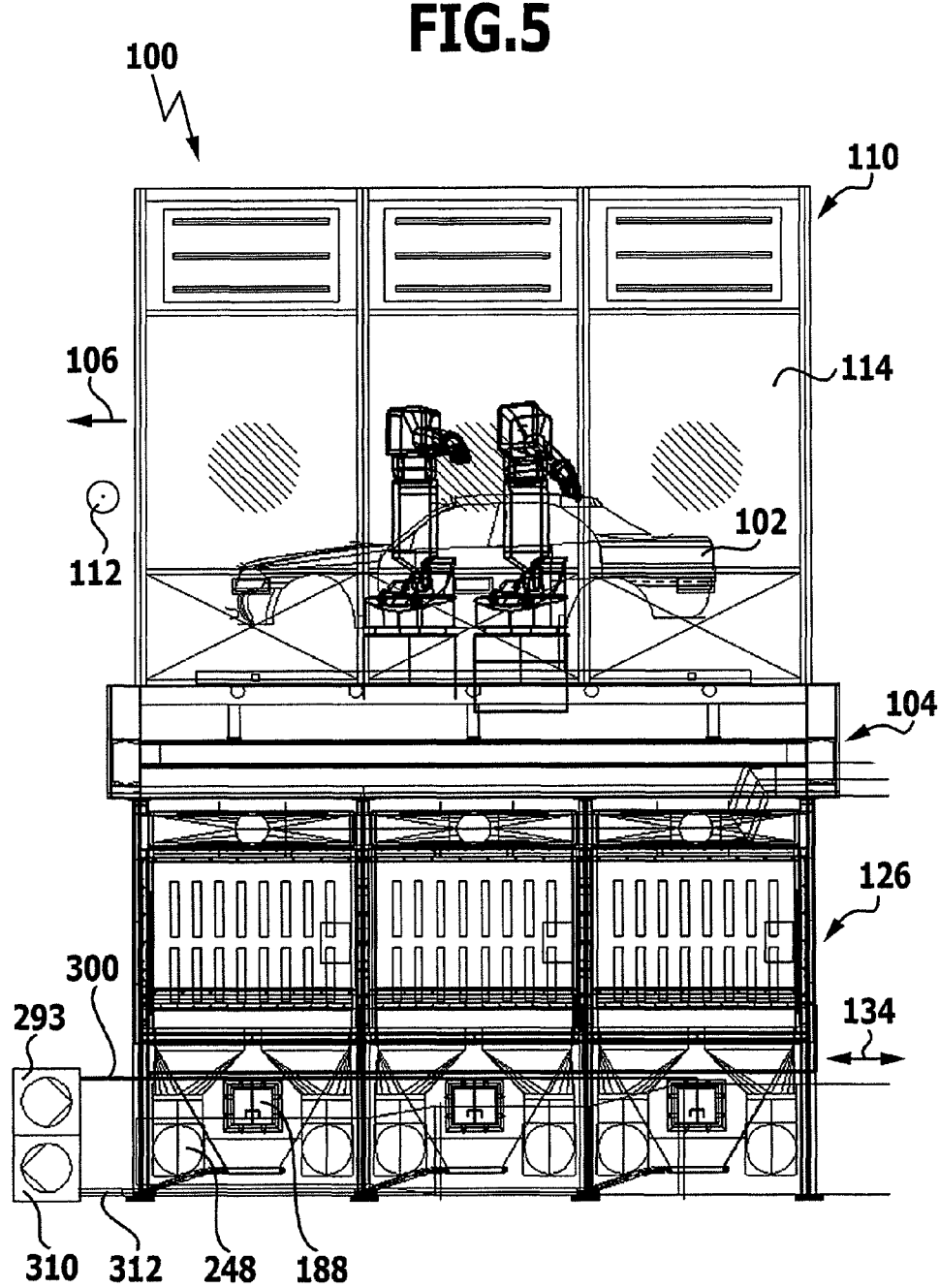
FIG. 5 shows a schematic side view of the plant from FIGS. 1 to 4.

A stream of air is generated by means of a circuit of circulating air (illustrated only in sections) and this passes through the application area 108 essentially vertically from the top to the bottom, as indicated in FIG. 3 by the arrows 118.

This stream of air absorbs paint overspray in the form of overspray particles in the application area 108. The term "particles" comprises not only solid but also liquid particles, in particular droplets.

When wet paint is used, the wet paint overspray consists of paint droplets. The majority of the overspray particles have a greatest dimension in the range of approximately 1 μm to approximately 100 μm.

Figure 10:
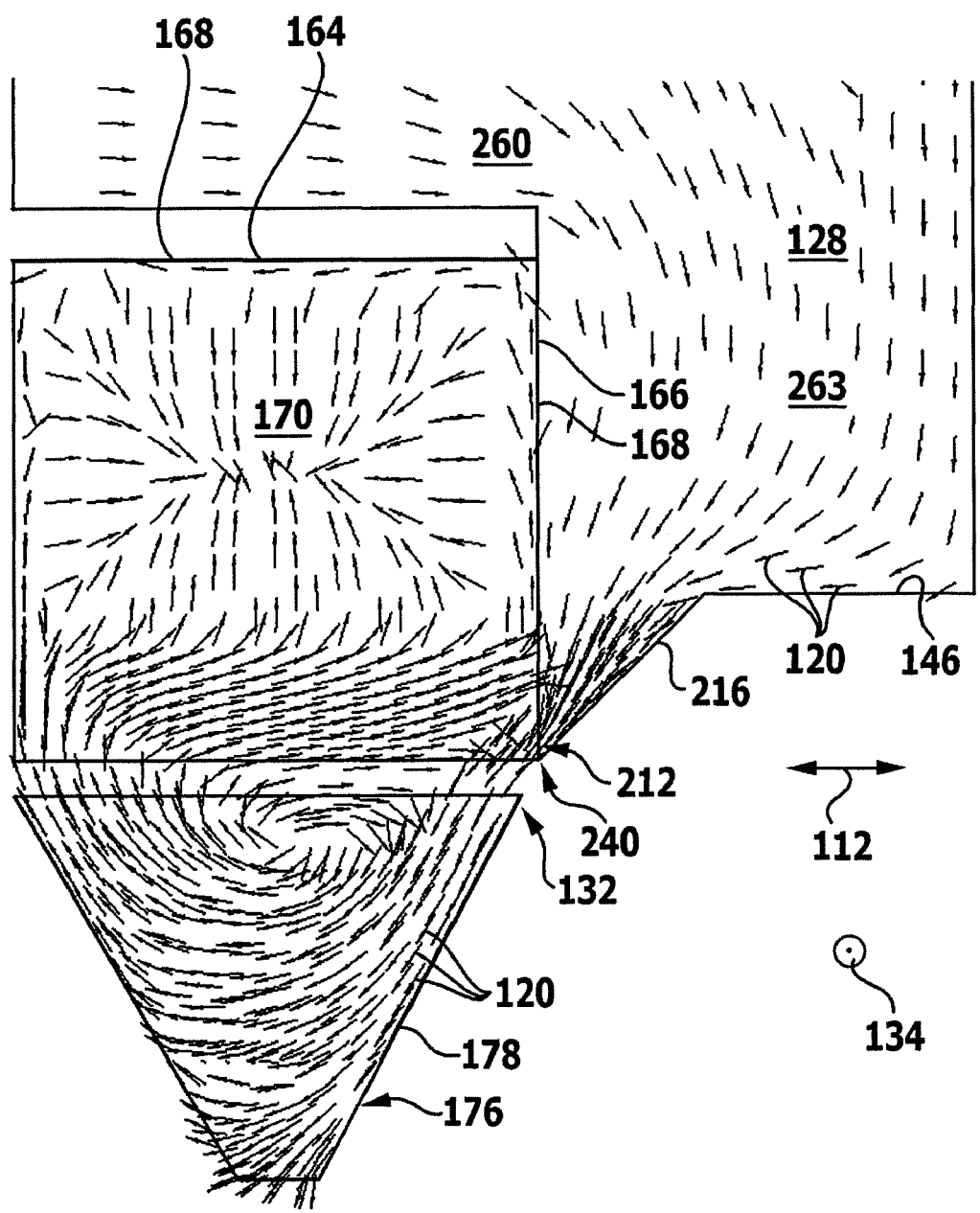
FIG. 10 shows a schematic vertical cross section through a filter module and the adjoining area of the flow chamber, in which the respective local flow direction of the stream of crude gas is indicated by arrows.
Figure 11:
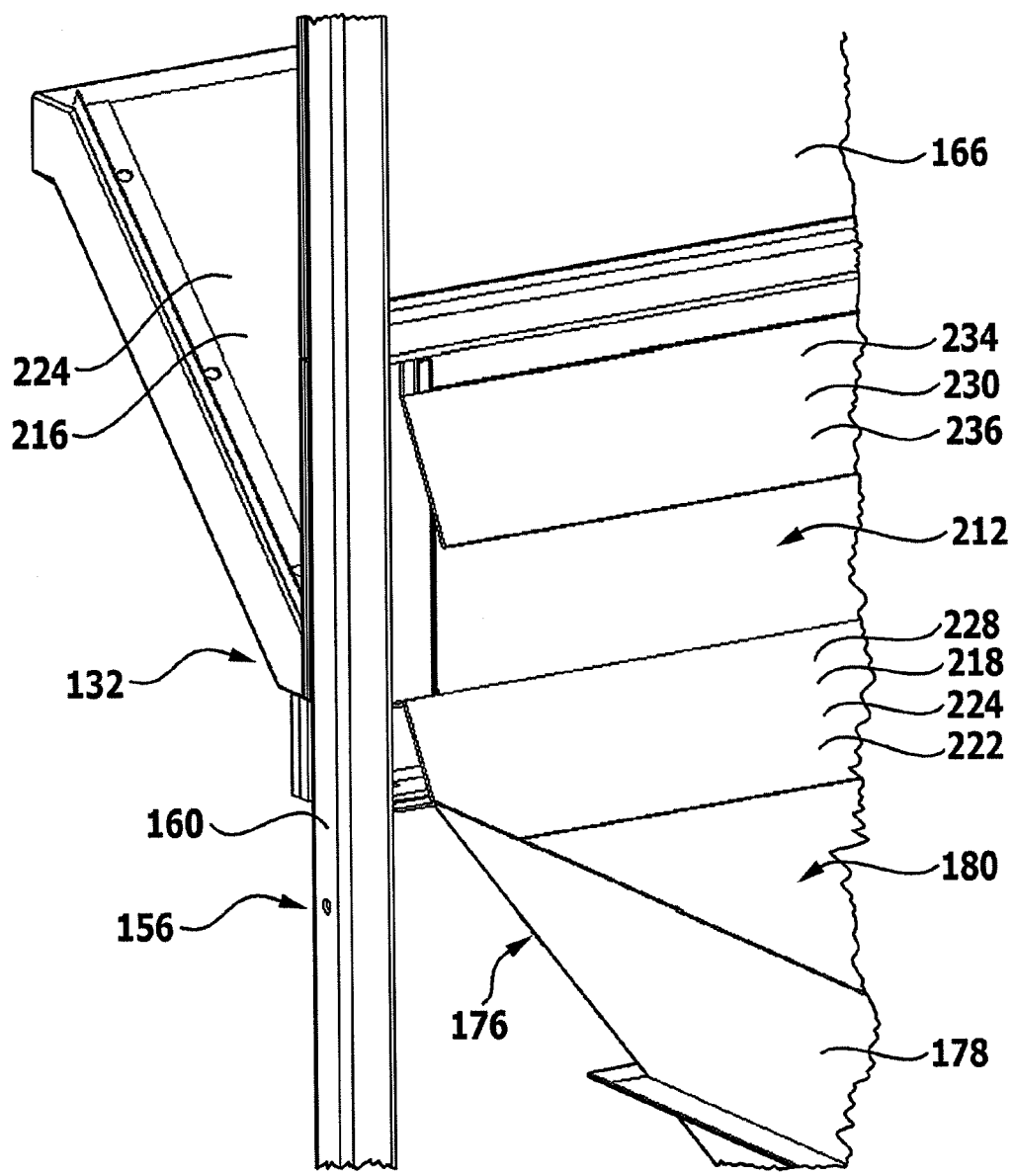
FIG. 11 shows a schematic perspective illustration of an edge area of an inlet opening of a filter module.

The stream of exhaust air laden with the overspray particles from the application area 108 is designated in the following as stream of crude gas. The flow direction of the stream of crude gas is illustrated in FIGS. 3 and 10 by arrows 120.

The stream of crude gas leaves the painting booth 110 downwards and passes into a device for separating wet paint overspray from the stream of crude gas, this device being designated as a whole as 126 and arranged beneath the application area 108.

The device 126 comprises an essentially parallelepiped flow chamber 128 which extends over the entire length of the painting booth 110 in the direction 106 of conveyance and is limited in the transverse direction 112 by vertical side walls 130 which are essentially in alignment with the lateral booth walls 114 of the painting booth 110 so that the flow chamber 128 has essentially the same horizontal cross sectional surface area as the painting booth 110 and is essentially arranged completely within the vertical projection of the basic surface area of the painting booth 110.

Figure 6:
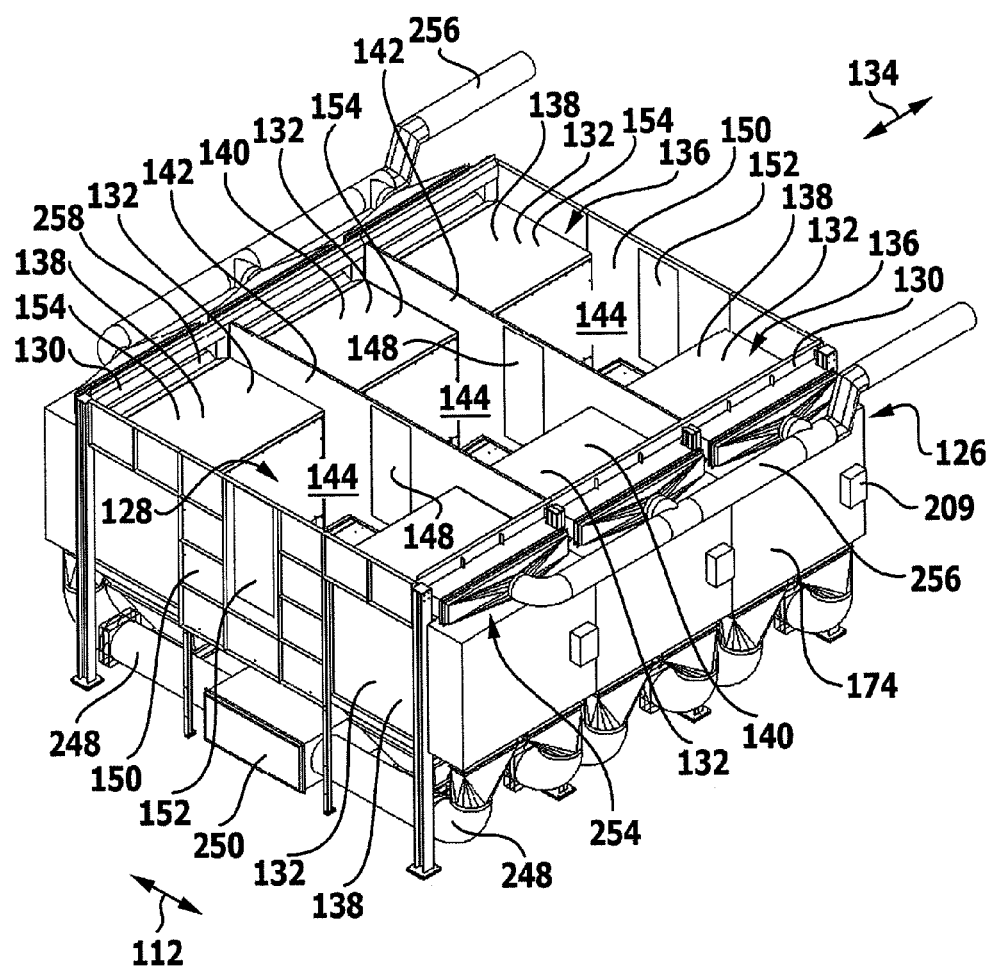
FIG. 6 shows a schematic perspective illustration of the device for separating wet paint overspray from a stream of crude gas containing overspray particles, the device being arranged beneath the painting booth of the plant from FIGS. 1 to 5 and having transverse partition walls subdividing the flow chamber into sections following one another along the longitudinal direction of the flow chamber.

As is best apparent from FIG. 6, several, for example, three filter modules 132 are arranged on each of the two sides of the flow chamber 128 and form two rows 136 of modules extending in the longitudinal direction 134 (which corresponds to the direction 106 of conveyance) of the device 126 for separating wet paint overspray.

Each of the rows 136 of modules comprises two corner modules 138 which each form an end of a row 136 of modules and at least one central module 140 arranged between two adjacent filter modules 132.

In order to avoid longitudinal flows of the stream of crude gas in the longitudinal direction 134 of the flow chamber 128 and to avoid flows of the crude gas between the individual filter modules 132, vertical transverse dividing walls 142 can be provided which extend in the transverse direction 112, are arranged between two respective filter modules 132 following one another in the longitudinal direction 134 and divide the flow chamber 128 into flow chamber sections 144 which follow one another along the longitudinal direction 134.

A defined adjustment of the flow of crude gas is possible for each individual filter module 132 as a result of these transverse dividing walls 142 irrespective of the flow of crude gas through the other filter modules 132.

Figure 2:
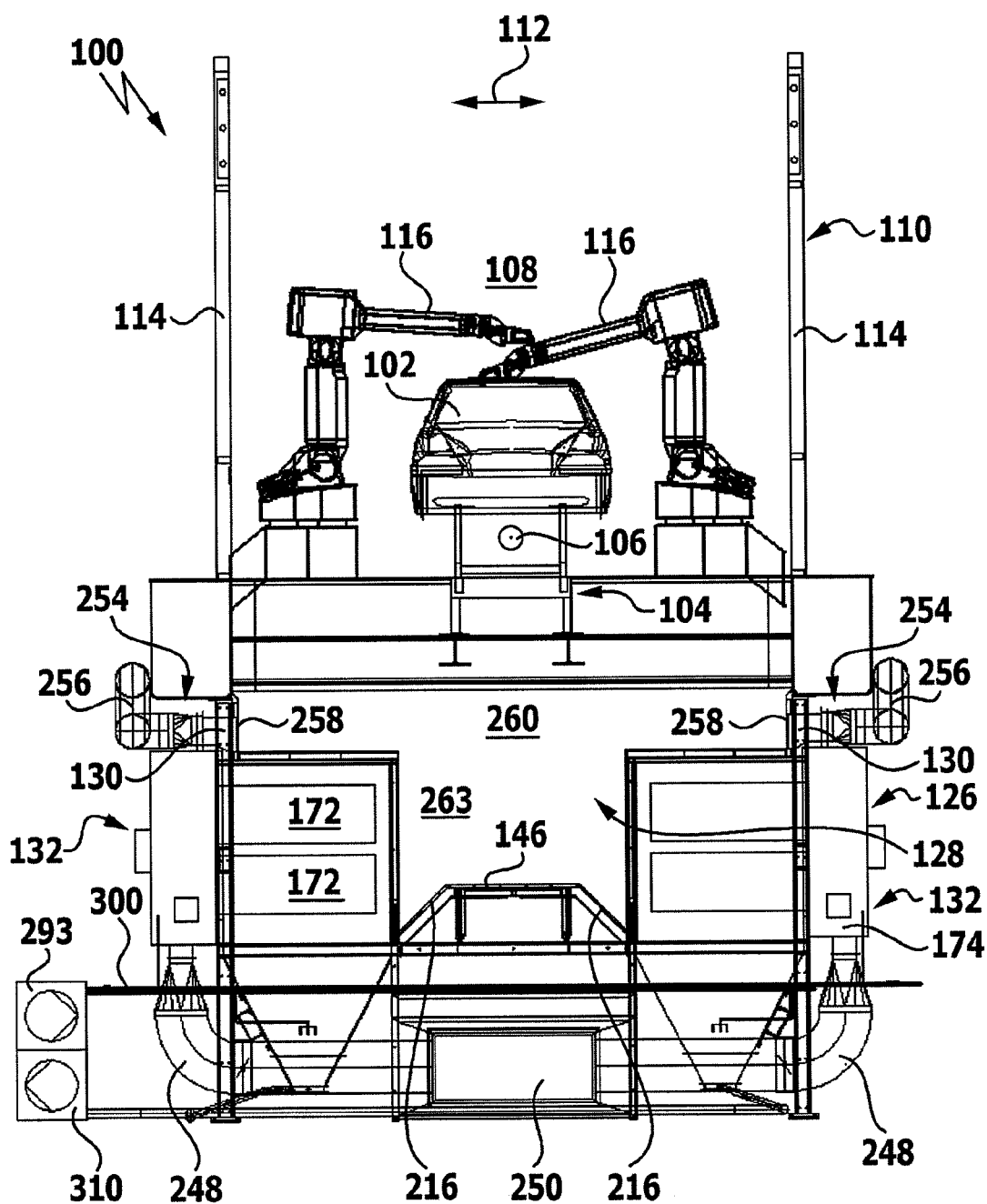
FIG. 2 shows a schematic vertical cross section through the plant from FIG. 1.

As is best apparent from FIG. 2, a catwalk 146, along which an operator can walk, is provided between the two rows 136 of modules.

In order to be able to walk on the sections of the catwalk 146 which are arranged in the consecutive flow chamber sections 144 uninterruptedly, doors 148 are provided in the transverse dividing walls 142 (FIG. 6).

The end walls 150 of the flow chamber 128 closing the flow chamber 128 at its front end and its rear end, respectively, are provided with access doors 152, through which an operator can pass into the flow chamber 128 from outside.

Each of the filter modules 132 is designed as a preassembled unit 154 which is produced at a location remote from the point of assembly of the paint plant and transported to the point of assembly of the paint plant as a unit. At the point of assembly, the preassembled unit 154 is arranged in the operating position provided and connected to one or several adjacent, preassembled units 154 or to the transverse dividing walls 142 arranged therebetween as well as to a support construction of the application area 108.

Figure 7:
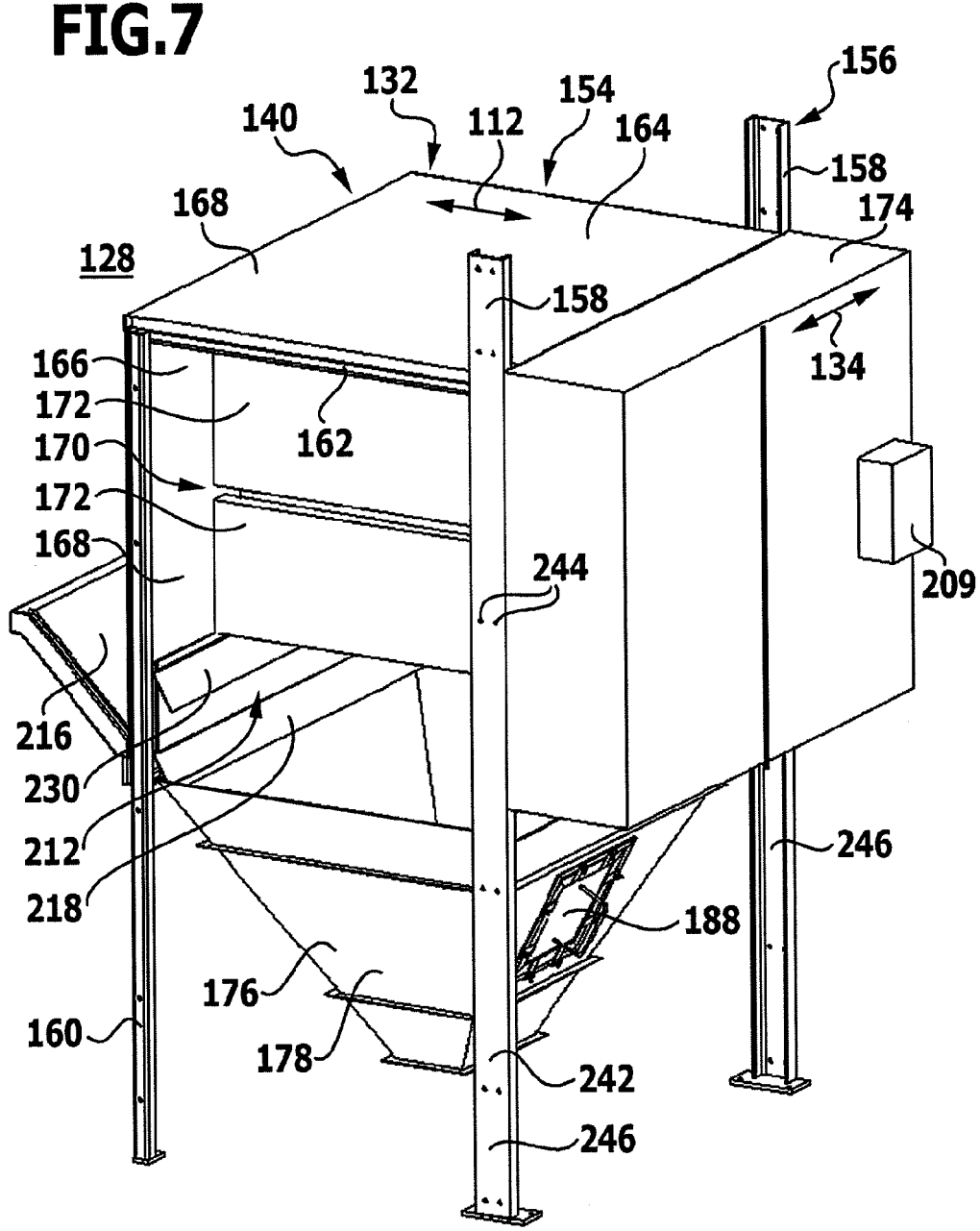
FIG. 7 shows a schematic perspective illustration of a single filter module which is provided for arrangement between two adjacent, additional filter modules (central module)

The construction of a filter module 132 will be described in the following based on the example of a central module 140 and with reference to FIGS. 7 and 9 to 16:

The module comprises a support construction 156 consisting of two vertical rear supports 158 and two vertical front supports 160 which are connected at their upper ends via horizontal crossbars 162 to one of the respective rear supports 158 (FIG. 7).

Furthermore, the front supports 160 are connected to one another at their upper ends by means of an additional crossbar (not illustrated).

The rear supports 158 are also connected to one another by means of crossbars (not illustrated) or by means of a connecting frame (not illustrated).

The crossbars at the upper end of the support construction 156 bear a horizontal ceiling wall 164.

A vertical front wall 166 of the filter module 132 is held at the front sides of the front supports 160.

The ceiling wall 164 and the front wall 166 form dividing walls 168 of the filter module 132 which separate a filter element chamber 170 arranged within the filter module 132 from the area of the flow chamber 128 located outside the filter module 132.

Several, for example, ten filter elements 172 are arranged in the filter element chamber 170 of the filter module 132 in two rows one above the other which project in a horizontal direction from a common base member 174 which is held at the rear sides of the rear supports 158.

The filter elements 172 can be designed, for example, from plates consisting of sintered polyethylene which are provided on their outer surfaces with a membrane consisting of polytetrafluoroethylene (PTFE).

The coating consisting of PTFE serves the purpose of upgrading the filter category of the filter elements 172 (i.e., of reducing their permeability) and, furthermore, of preventing the permanent adhesion of the wet paint overspray separated from the stream of crude gas.

The porosity of both the basic material of the filter elements 172 and their PTFE coating is such that the crude gas can pass through the pores into the interior space of the respective filter element 172.

In order to prevent the filter surfaces becoming clogged, they are provided, in addition, with a barrier layer consisting of auxiliary material discharged into the stream of crude gas. This preferably particulate auxiliary material is also normally designated as a "precoat" material.

The barrier layer is formed during operation of the device 126 as a result of deposition of the auxiliary material discharged into the stream 120 of crude gas at the filter surfaces and prevents the filter surfaces becoming clogged by wet paint overspray adhering thereto.

Auxiliary material from the stream 120 of crude gas is also deposited on the inner sides of the ceiling wall 164 and the front wall 166 of the filter module 132 where it likewise prevents wet paint overspray adhering thereto.

Any medium which is capable of absorbing the liquid content of the wet paint overspray can, in principle, be used as auxiliary material.

In particular, lime, rock meal, aluminum silicates, aluminum oxides, silicon oxides, coating powder or the like can, for example, be considered as auxiliary materials.

Alternatively or in addition hereto, particles having a cavity structure and a large inner surface area relative to their outer dimensions, for example, zeolites or other hollow, for example, spherical bodies consisting of polymers, glass or aluminum silicate and/or natural or synthetically generated fibers can also be used as auxiliary material for absorbing and/or binding the overspray.

Alternatively or in addition hereto, particles which react chemically with the overspray, for example, chemically reactive particles consisting of amine, epoxide, carboxyl, hydroxyl or isocyanates groups, chemically reactive particles consisting of aluminum oxide subsequently treated with octylsilane or solid or liquid monomers, oligomers or polymers, monosilanes, silanols or siloxanes can also be used as auxiliary material for absorbing and/or binding the overspray.

The auxiliary material preferably consists of a plurality of auxiliary material particles which have an average diameter in the range of, for example, approximately 10 μm to approximately 100 μm.

Figure 13:
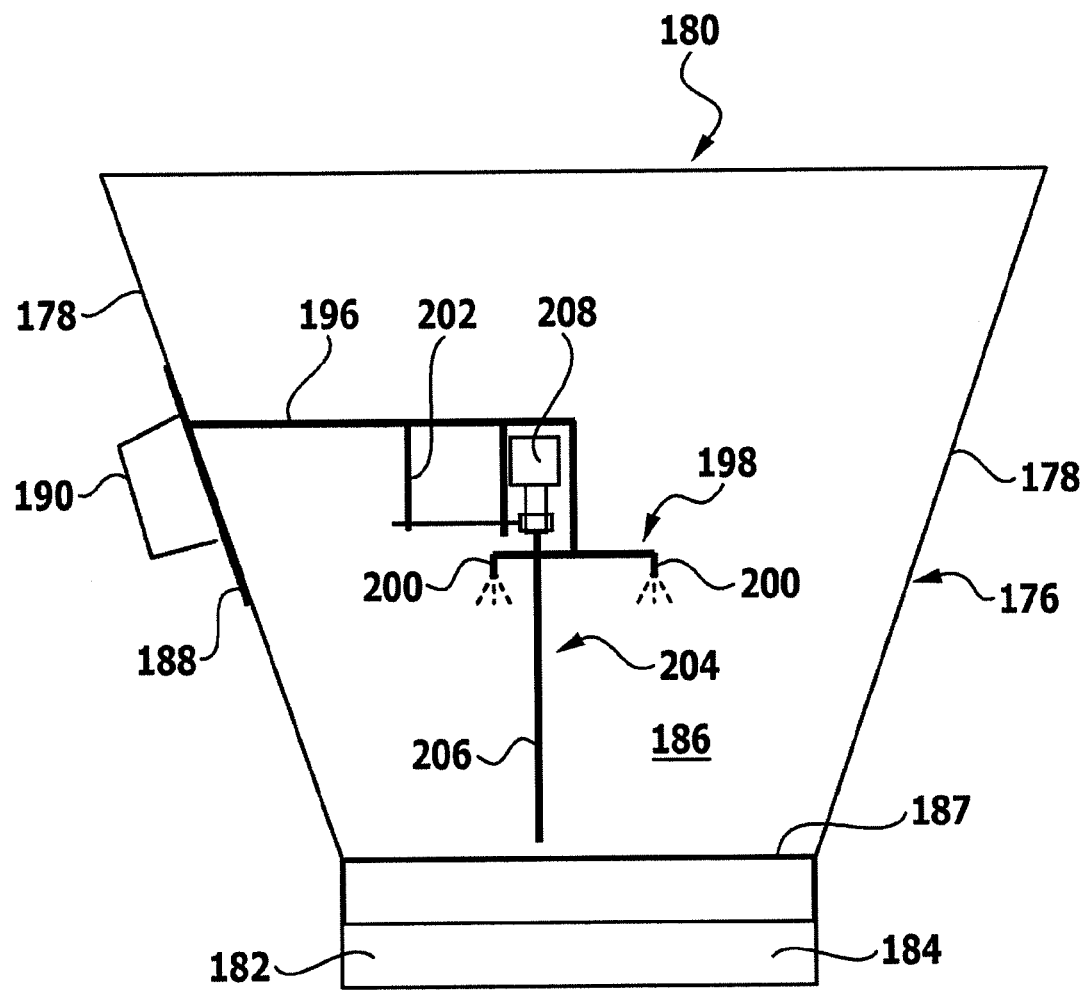
FIG. 13 shows a schematic vertical section through a receptacle for auxiliary material with a filling level sensor and whirling device arranged in the interior of the receptacle.

In order to be able to add the auxiliary material to the stream of crude gas without there being the risk of the auxiliary material passing into the application area 108 of the paint plant 100, each filter module 132 is provided with a receptacle 176 for auxiliary material which is held on the support construction 156 and has, for example, a funnel-like shape in the form of an upturned truncated pyramid (FIG. 13).

The four trapezoidal side walls 178 of the receptacle 176 for auxiliary material are inclined in relation to the vertical at an angle of at least approximately 60°.

The height of the receptacle 176 for auxiliary material is, for example, approximately 1.1 m.

The upper edges of the side walls 178 surround an access opening 180 of the receptacle 176 for auxiliary material, through which the stream 120 of crude gas laden with overspray can enter the receptacle 176 for auxiliary material and escape from it again.

The base 182 which is aligned essentially horizontal is designed as a porous fluid base 184 which can be flushed with a gaseous medium, in particular with compressed air, in order to fluidize the auxiliary material arranged in the interior space 186 of the receptacle 176 for auxiliary material and to level locally varying filling heights of the auxiliary material within the receptacle 176 for auxiliary material.

During operation of the plant 100, the fluid base is put into operation intermittently, for example, three times per minute for approximately two seconds each time.

Figure 16:
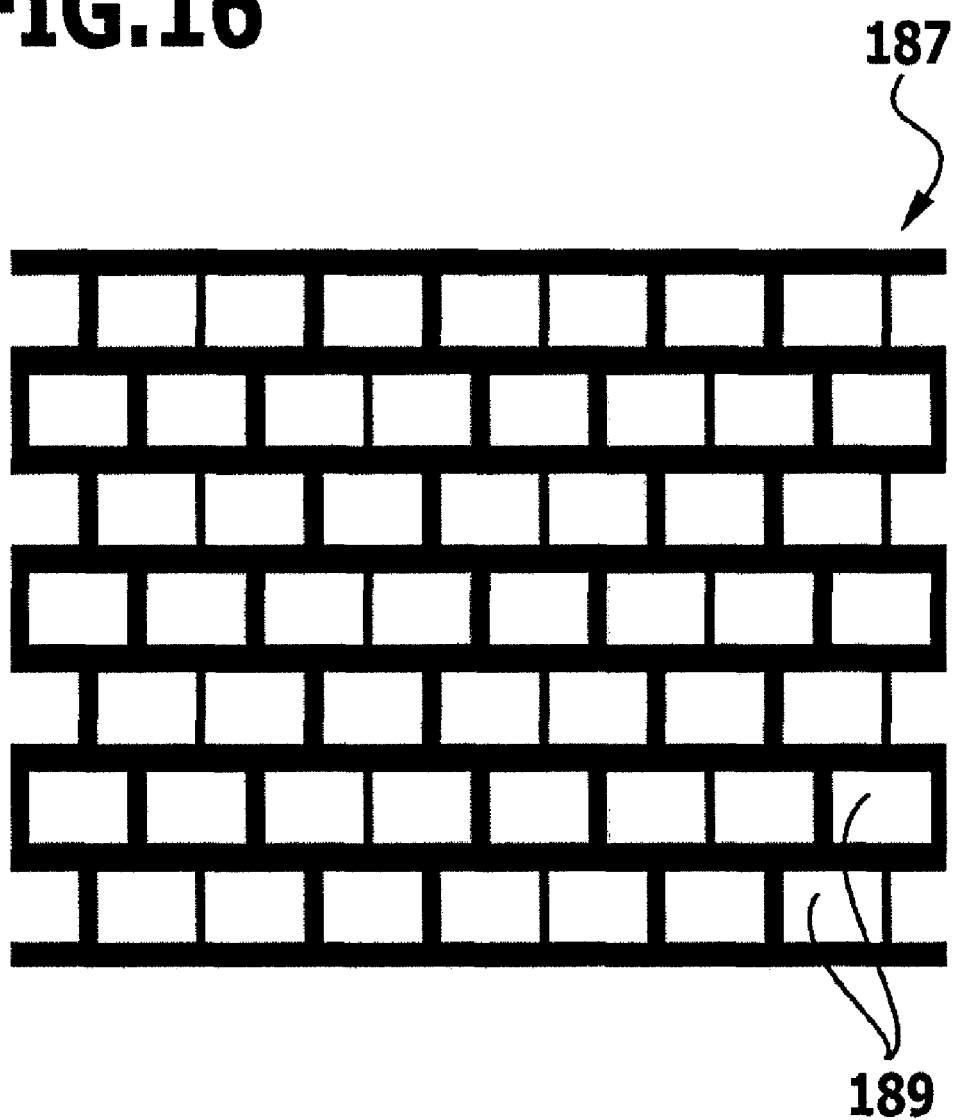
FIG. 16 shows a schematic plan view from above of a collector grating arranged in the receptacle for auxiliary material from FIG. 13.

In order to prevent damage to the fluid base 184 due to larger objects falling onto it, a collector grating or retention grating 187 is arranged at a distance of, for example, 20 cm above the fluid base 184 and this grating extends in a horizontal direction over the entire cross section of the interior space 186 of the receptacle 176 for auxiliary material and has a plurality of rows of honeycomb-like or rectangular openings 189 for the passage of auxiliary material through the retention grating 187. The openings are arranged so as to be offset relative to one another from row to row and have a size of, for example, approximately 30 mm×30 mm (FIG. 16).

Figure 14:
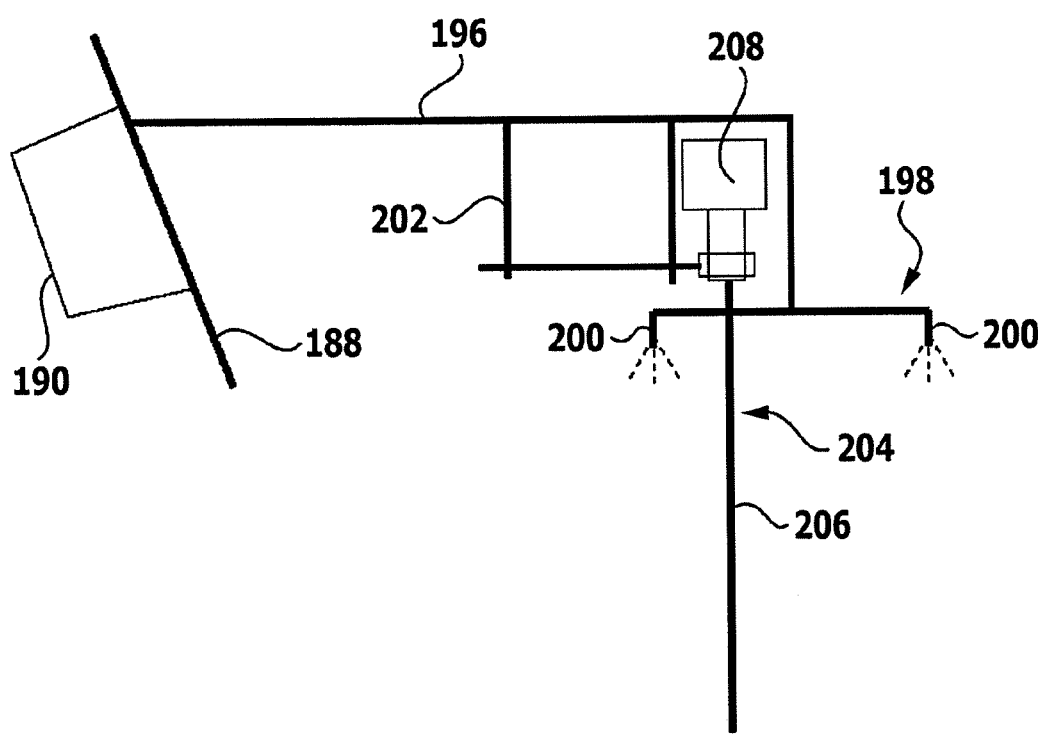
FIG. 14 shows a schematic side view of an inspection door in the receptacle for auxiliary material from FIG. 13, with a filling level sensor and whirling device held on the inspection door.
Figure 15:
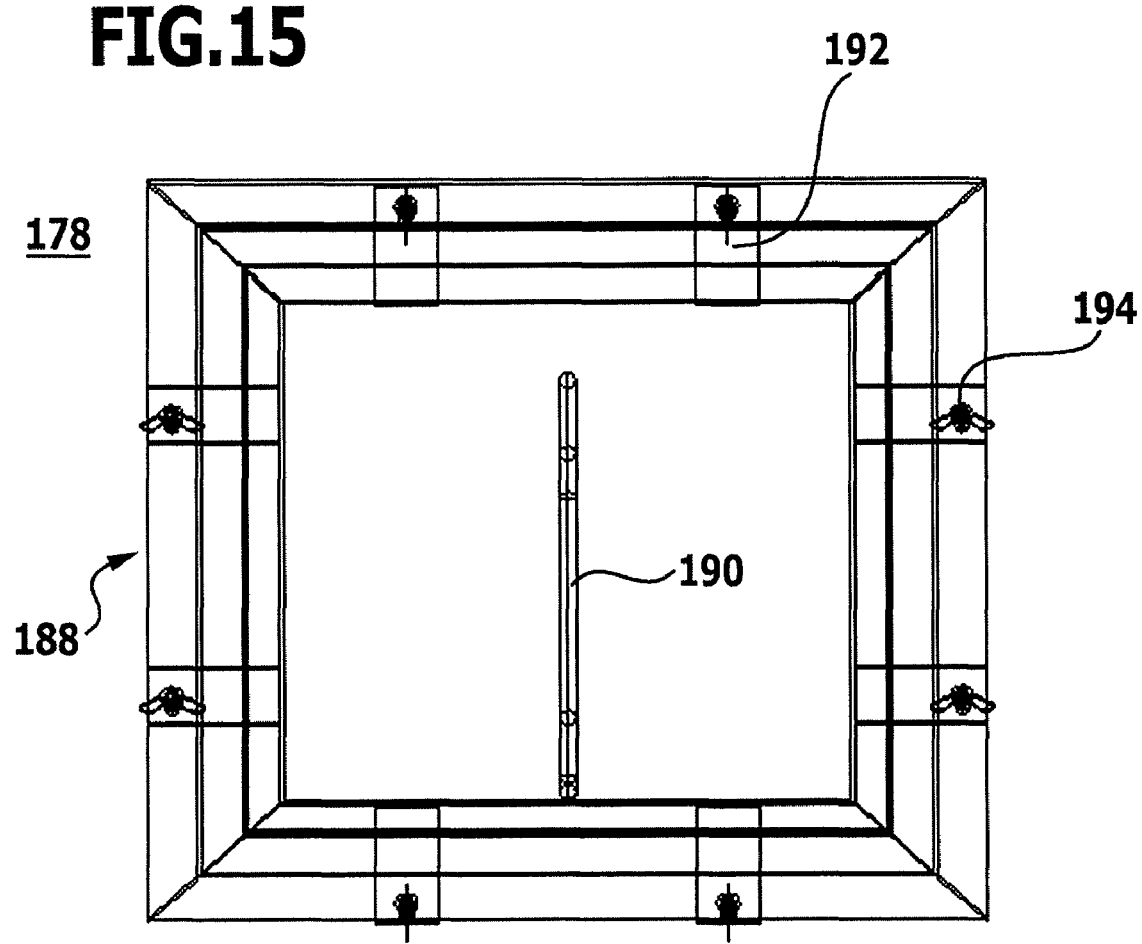
FIG. 15 shows a schematic plan view of the outer side of the inspection door from FIG. 14.

In order to enable access to the interior space 186 of the receptacle for auxiliary material 176 for maintenance purposes, one of the side walls 178 is provided with an inspection opening which is closed during operation of the filter modules 132 by an inspection door 188 with a handle 190 (cf. FIGS. 13 to 15).

As is apparent from FIG. 15, the inspection door 188 is detachably held on the associated side wall 178 of the receptacle 176 for auxiliary material by means of clamps 192 with butterfly nuts 194.

A pipe 196 for compressed air which leads to a whirling device 198 is held on the inspection door 188 (FIG. 14).

The whirling device 198 serves the purpose of sending pulses of compressed air into the auxiliary material located therebelow in order to whirl up this auxiliary material and thus introduce it into the stream of crude gas conveyed through the receptacle 176 for auxiliary material.

In addition, a homogenization of the mixture of auxiliary material and overspray bonded thereto, which is present in the receptacle 176 for auxiliary material, is achieved when the auxiliary material is whirled up by means of the whirling device 198.

During operation of the plant 100, the whirling device 198 is put into operation intermittently, for example, four times per minute for approximately 5 seconds each time.

The whirling device 198 comprises several, for example, two exit nozzles 200 for compressed air which are designed as conical nozzles and can each generate a cone of compressed air which widens downwards towards the base 182 of the receptacle 176 for auxiliary material.

The exit nozzles 200 are preferably designed and arranged such that the cones of compressed air generated by the exit nozzles 200 together sweep over the entire floor surface of the receptacle 176 for auxiliary material.

Furthermore, a holder 202 for a filling level sensor 204 is arranged on the pipe 196 for compressed air and comprises a rod-like sensor element 206 and a sensor housing 208 with sensor electronics accommodated therein (FIG. 14).

The filling level sensor 204 is designed as an analog, in particular capacitive sensor and serves the purpose of generating a signal which corresponds each time to a value from a plurality of discrete filling level heights or from a continuum of filling level heights in order to be able to determine the filling level of the auxiliary material in the receptacle 176 for auxiliary material as exactly as possible.

The rod-like sensor element 206 of the filling level sensor 204 is aligned essentially vertically and arranged as far as possible from the side walls 178 of the receptacle 176 for auxiliary material in the vicinity of the center of the interior space 186 of the receptacle 176 for auxiliary material in order for the measurement result of the filling level sensor 204 to be affected as little as possible as a result of marginal effects (FIG. 13).

The rod-like sensor element 206 of the filling level sensor 204 is aligned essentially at right angles to the horizontal base 182 of the receptacle 176 for auxiliary material.

Figure 19:
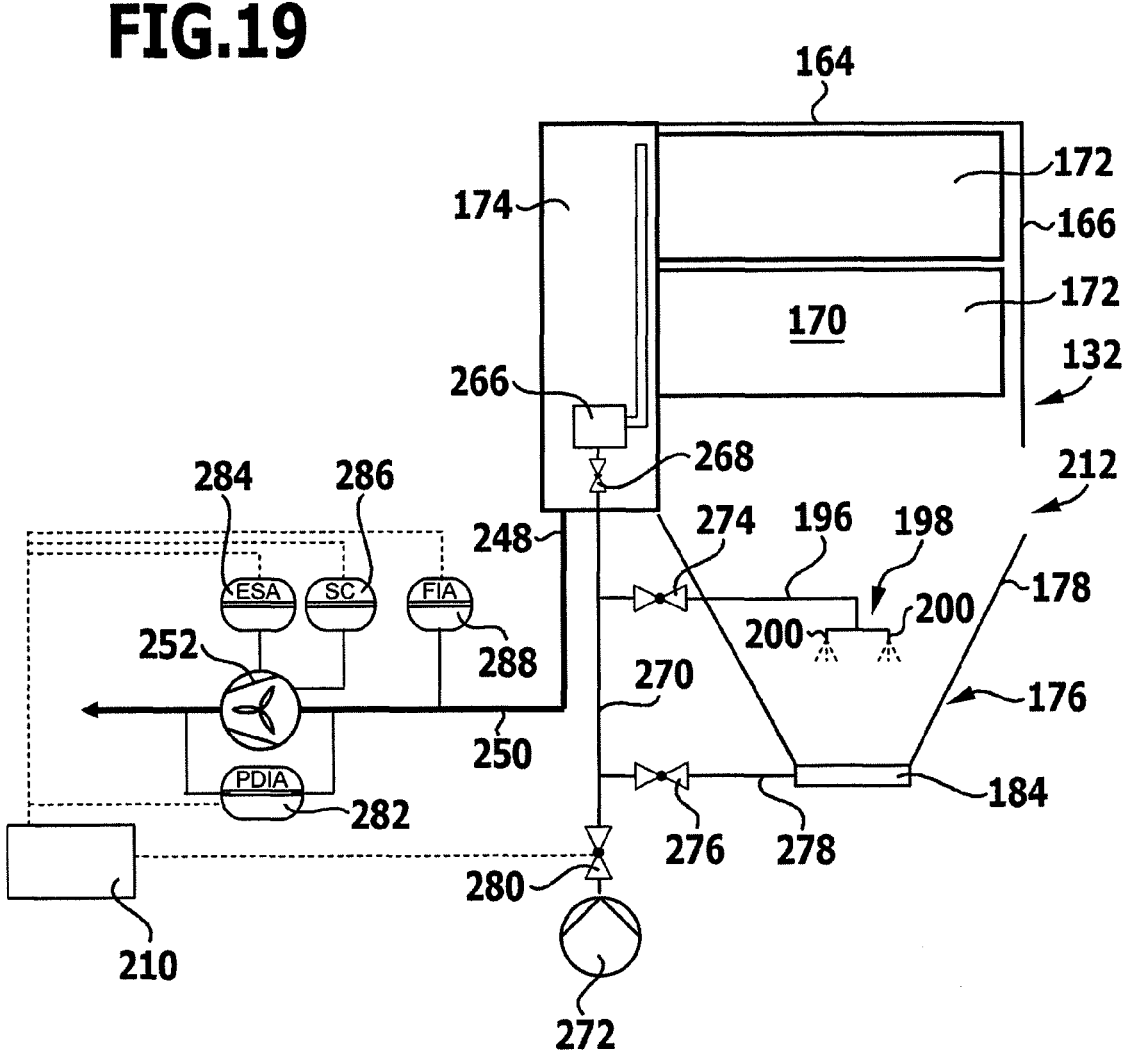
FIG. 19 shows a schematic illustration of a filter module and an exhaust air line with a blower arranged downstream of the filter module as well as various devices for monitoring the operational state of the blower and a device for supplying compressed air to the filter elements, to a whirling unit and to a fluid base of the filter module.

The signal which is generated by the filling level sensor 204 is transmitted via a signal line (not illustrated) to an electrical connection box 209 of the filter module 132 which is arranged on the base member 174 of the filter elements 172 (cf. FIG. 7) and from there to a control device of the plant 100 which is illustrated schematically in FIG. 19 and designated as 210.

Figure 9:
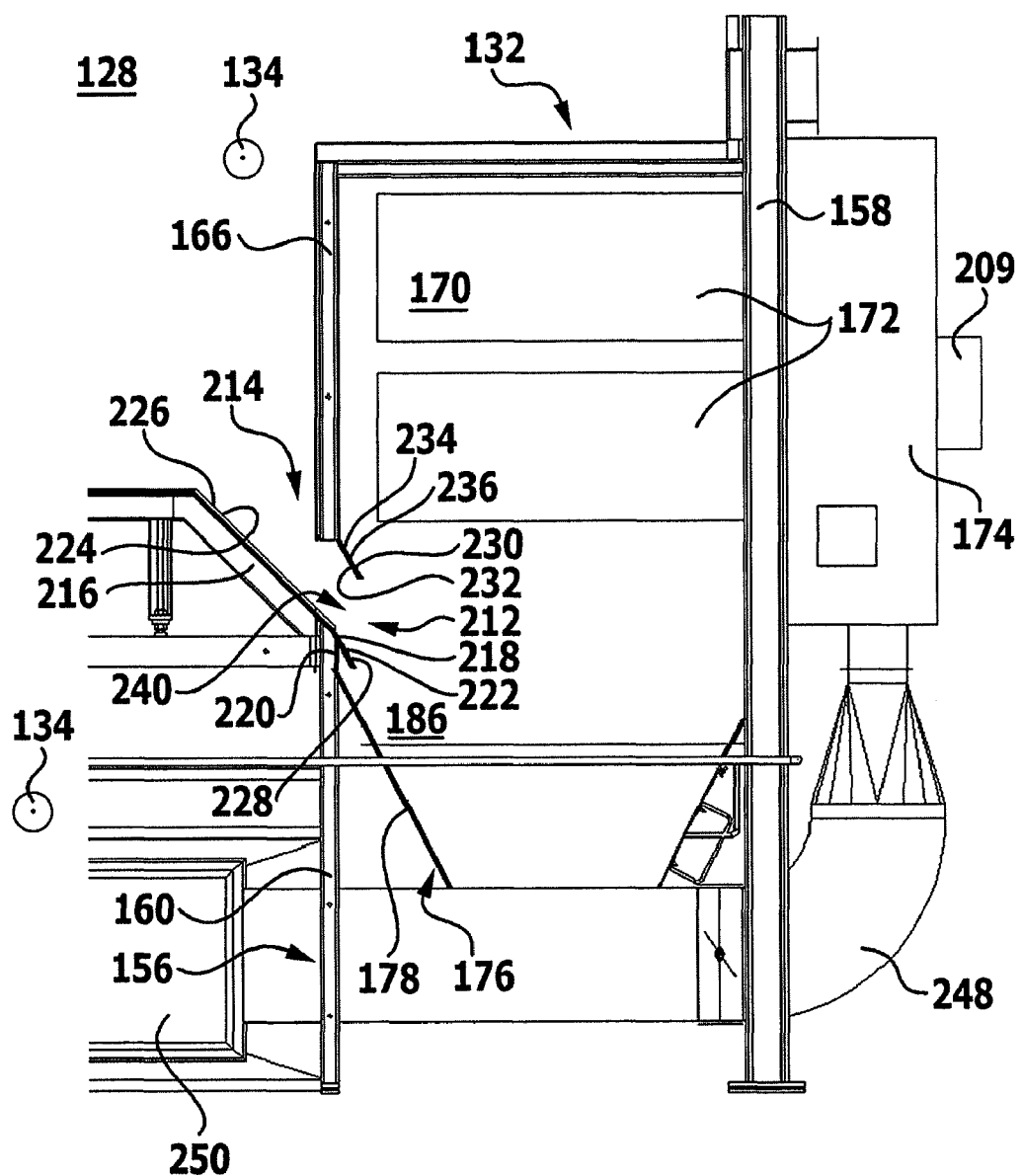
FIG. 9 shows a schematic vertical cross section through a filter module.

In order to convey the stream of crude gas entering the filter module 132 into the interior space 186 of the receptacle 176 for auxiliary material in a targeted manner and to prevent any direct access of the stream of crude gas from the flow chamber 128 to the filter elements 172, each filter module 132 is provided, in addition, with a slit-like inlet opening 212 which is designed as an inlet channel 214 which has, for example, as is apparent, in particular, from FIG. 9, a flow-through cross section narrowing in the flow direction of the stream of crude gas as far as a narrow point 240.

Alternatively or in addition hereto, it may also be provided for the inlet channel 214 to have a flow-through cross section widening in the flow direction of the stream of crude gas proceeding from a narrow point 240.

The inlet channel 214 is limited downwards by an inclined inlet surface 216, which extends at an angle upwards from the front supports 160 of the support construction 156, inclined at an angle of, for example, approximately 40° to approximately 65° in relation to the horizontal, and by a lower guide plate 218 which adjoins the lower end of the inclined inlet surface 216 and is inclined at a greater angle in relation to the horizontal than the inclined inlet surface 216, for example, at an angle of approximately 55° to approximately 70° and which projects beyond an upper section 220 of a side wall 178 of the receptacle 176 for auxiliary material aligned essentially vertically and projects into the interior space 186 of the receptacle 176 for auxiliary material.

In this way, the lower guide plate 218 acts as a retention element 222 which keeps auxiliary material from the receptacle 176 for auxiliary material away from the inlet opening 212 and prevents auxiliary material which has been whirled up from passing out of the receptacle 176 for auxiliary material along the side wall 178 on the side of the inlet opening 212.

In addition, the lower guide plate 218 prevents any breakdown in the flow of crude gas after it has passed the inclined inlet surface 216 and ensures an oriented flow of crude gas into the receptacle 176 for auxiliary material.

The lower guide plate 218 has a depth (i.e., an extension in the flow direction of the stream of crude gas) of, for example, approximately 100 mm.

The inclined inlet surface 216 and the lower guide plate 218 extend in the longitudinal direction 134 of the flow chamber 128 over essentially the entire length of the inlet opening 212 of, for example, approximately 1 m to approximately 2 m which corresponds more or less to the extension of the entire filter module 132 in the longitudinal direction 134.

The upper side of the inclined inlet surface 216 and the upper side of the lower guide plate 218 together form a lower guide surface 224 of the inlet opening 212 which limits the inlet opening 212 downwards and in its upper section 226, which is formed by the inclined inlet surface 216, has an inclination in relation to the horizontal of approximately 40° to approximately 65° and in its lower section 228, which is formed by the lower guide plate 218, has a greater inclination in relation to the horizontal of approximately 55° to approximately 70°.

Upwardly, the inlet opening 212 is limited by the lower edge of the front wall 166 and by an upper guide plate 230 which projects from the lower edge of the front wall 166 at an angle downwards into the interior space of the filter module 132.

The upper guide plate 230 is, in the same way as the lower guide plate 218, inclined in relation to the horizontal by an angle of, for example, approximately 55° to approximately 70° and extends in the longitudinal direction 134 over essentially the entire width of the inlet opening 212 of, for example, 1 m or 2 m.

The upper guide plate 230 has a depth (i.e., an extension along the flow direction of the stream of crude gas) of, for example, approximately 150 mm.

The lower side of the upper guide plate 230 forms an upper guide surface 232 which limits the inlet opening 212 upwards and is inclined in relation to the horizontal at an angle of, for example, approximately 55° to approximately 70°.

As a result of this upper guide surface 232 for the stream of crude gas, the flow of crude gas does not break down at the front wall 166 of the filter module 132 but is rather conveyed directly into the receptacle 176 for auxiliary material.

The upper guide plate 230 serves, in addition, as a filter shielding element 234 since it is designed and arranged at the inlet opening 212 such that it prevents the crude gas entering the filter module 132 from flowing directly to the filter elements 172.

Furthermore, the upper guide plate 230 serves as a deflector element 236 which keeps material, which has been cleaned off the filter elements 170 and contains auxiliary material and overspray particles bonded to the auxiliary material, away from the inlet opening 212.

Material dropping from the filter elements 172 onto the upper side of the upper guide plate 230 will, on the contrary, be directed into the receptacle 176 for auxiliary material as a result of the inclined position of the upper guide plate 230.

During operation of the filter module 132, both the upper guide surface 232 and also the upper side of the upper guide plate 230 are provided with a coating consisting of the auxiliary material so that these surfaces of the upper guide plate 230 are easy to clean and no overspray adheres directly to the upper guide plate 230.

Figure 12:
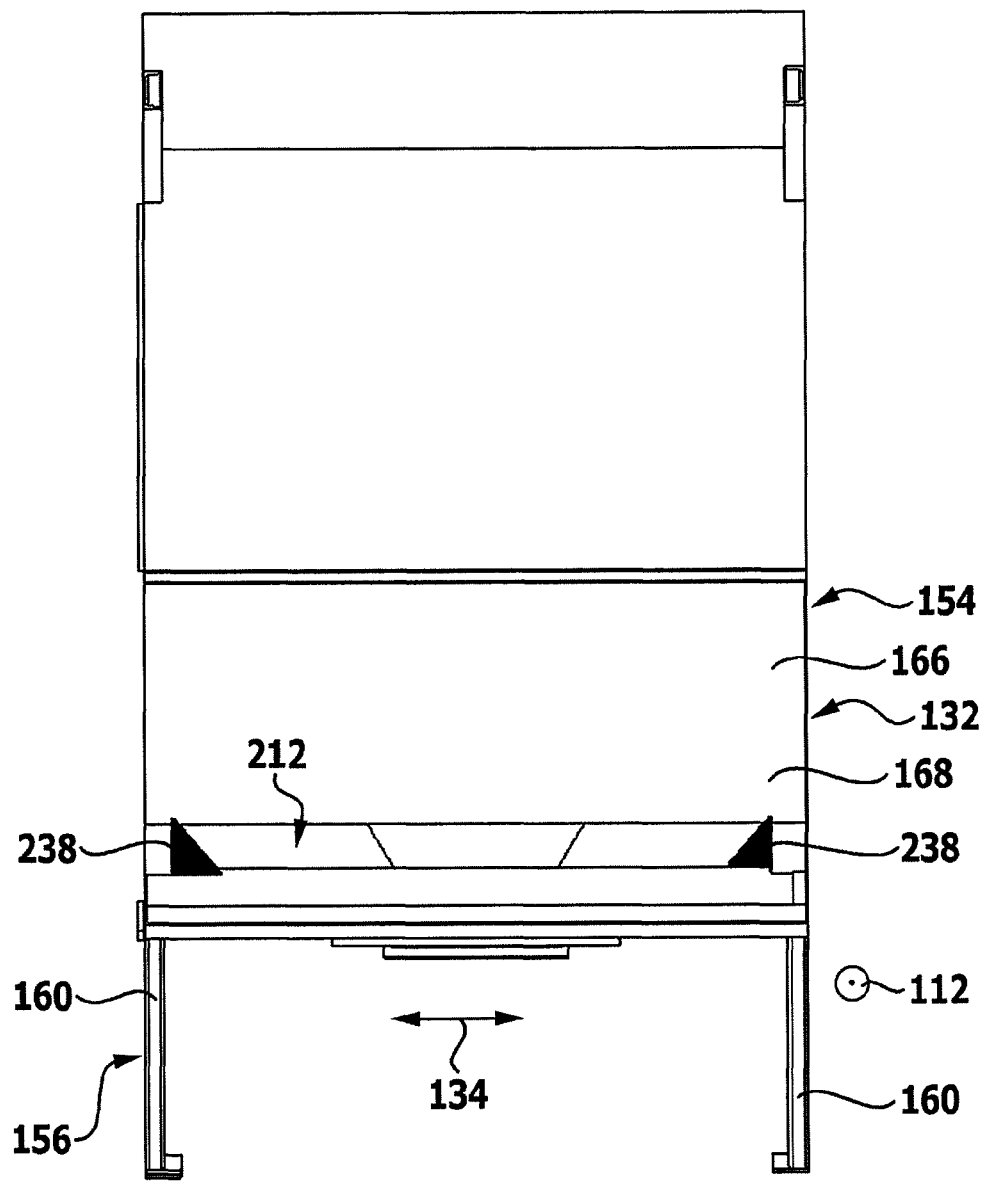
FIG. 12 shows a schematic front view of a filter module.

As is best apparent from FIG. 12, the filter module 132 comprises, in addition, two cover elements 238 in the form of approximately triangular cover plates which cover the left and the right lower corner areas of the inlet opening 212 such that auxiliary material and overspray from the stream of crude gas will be kept away from these corner areas of the inlet opening 212 and deposits of auxiliary material and of overspray particles in these corner areas and outside the filter module 132 on the inclined inlet surface 216 are prevented.

The upper sides of the cover elements 238 are aligned at an angle to the vertical and at an angle to the horizontal and each have a surface normal which is directed upwards into the external space of the filter module 132.

As a result of the configuration of the geometry of the inlet opening 212 described above, the inlet opening 212 has a narrow point 240, at which the flow-through cross section of the inlet opening 212 is at its smallest and, therefore, the velocity of the crude gas at its greatest.

The velocity of the crude gas in the narrow point is preferably from approximately 2 m/s to approximately 8 m/s, in particular from approximately 3 m/s to approximately 5 m/s.

In this way, auxiliary material from the interior of the filter module 132, which forms a closed box, is effectively prevented from reaching the flow chamber 128 and, from there, the application area 108. The whirling up of the auxiliary material in the receptacle 176 for auxiliary material and the cleaning of the filter elements 172 can, therefore, take place at any optional point of time without the supply of crude gas to the filter module 132 or even the operation of the spray painting devices 116 in the application area 108 needing to be interrupted.

Furthermore, it is ensured, as a result of the fact that the stream of crude gas exits from the inlet opening 212 in a manner directed into the receptacle 176 for auxiliary material, that the stream of crude gas in the interior space 186 of the receptacle 176 for auxiliary material is redirected. As a result, a sufficient amount of auxiliary material, which is generated by it being whirled up from the supply located in the receptacle 176 for auxiliary material, is taken along by the stream of crude gas.

The flow of crude gas out of the flow chamber 128 through the inlet opening 212 into the interior space of the filter module 132 is illustrated in FIG. 10 as the result of a flow simulation. It is clearly apparent from this that a cylindrical flow is formed in the interior space of the filter module 132, the horizontally extending axis of which lies somewhat deeper than the upper edge of the receptacle 176 for auxiliary material.

On the side of the receptacle 176 for auxiliary material which is located opposite the inlet opening 212, the flow of crude gas laden with auxiliary material flows out of the receptacle 176 for auxiliary material again and is then distributed over the entire depth of the filter element chamber 170 so that a vortex is formed around the filter elements 172 and a homogeneous distribution of the auxiliary material to the individual filter elements 172 is ensured on account of the considerable dynamics which the stream of crude gas has attained in the narrow point 240.

Since hardly any components of the filter module 132 are located in the flow path of the incoming stream of crude gas, any soiling of components by sticky paint is avoided to a great extent and, nevertheless, the flow to the filter elements 172 is favorable for the filtering.

As a result of the fact that the average flow direction of the stream of crude gas entering the filter module 132 through the narrow point 240 is inclined at an angle of more than 40° in relation to the horizontal, an air lock, which would convey material cleaned off from the filter elements 172 immediately back to the filter elements 172 again and could lead to the formation of swirls of air within the filter module 132 which are opposite to one another, is prevented from being formed in the lower area of the filter element chamber 170.

In order to be able to connect to one another two filter modules 132, which are arranged next to one another in a row 136 of modules, in a simple and stable manner or in order to be able to connect one filter module 132 to an adjoining transverse dividing wall 142, the support construction 156 of each filter module 132 comprises at least one rear support 158 which has an essentially flat contact surface 242 which is aligned vertically and in the transverse direction 112 and can abut on a corresponding contact surface 242 of an adjacent filter module 132 or on an adjacent transverse dividing wall 142 (FIG. 7).

Openings 244 for the passage of attachment elements, by means of which the rear support 158 serving as connecting element 246 can be connected to a connecting element 246 of an adjacent filter module 132 or to an adjacent transverse dividing wall 142, are provided, in addition, in the contact surface 242.

The rear support 158 serving as connecting element 246 preferably has an approximately U-shaped profile.

As is apparent from FIG. 7, each central module 140 has two rear supports 158 which serve as connecting elements 246 and have U-shaped profiles, the open sides of which face one another so that the central module 140 can be connected on both sides to an adjoining, additional filter module 132 or to a transverse dividing wall 142.

Figure 8:
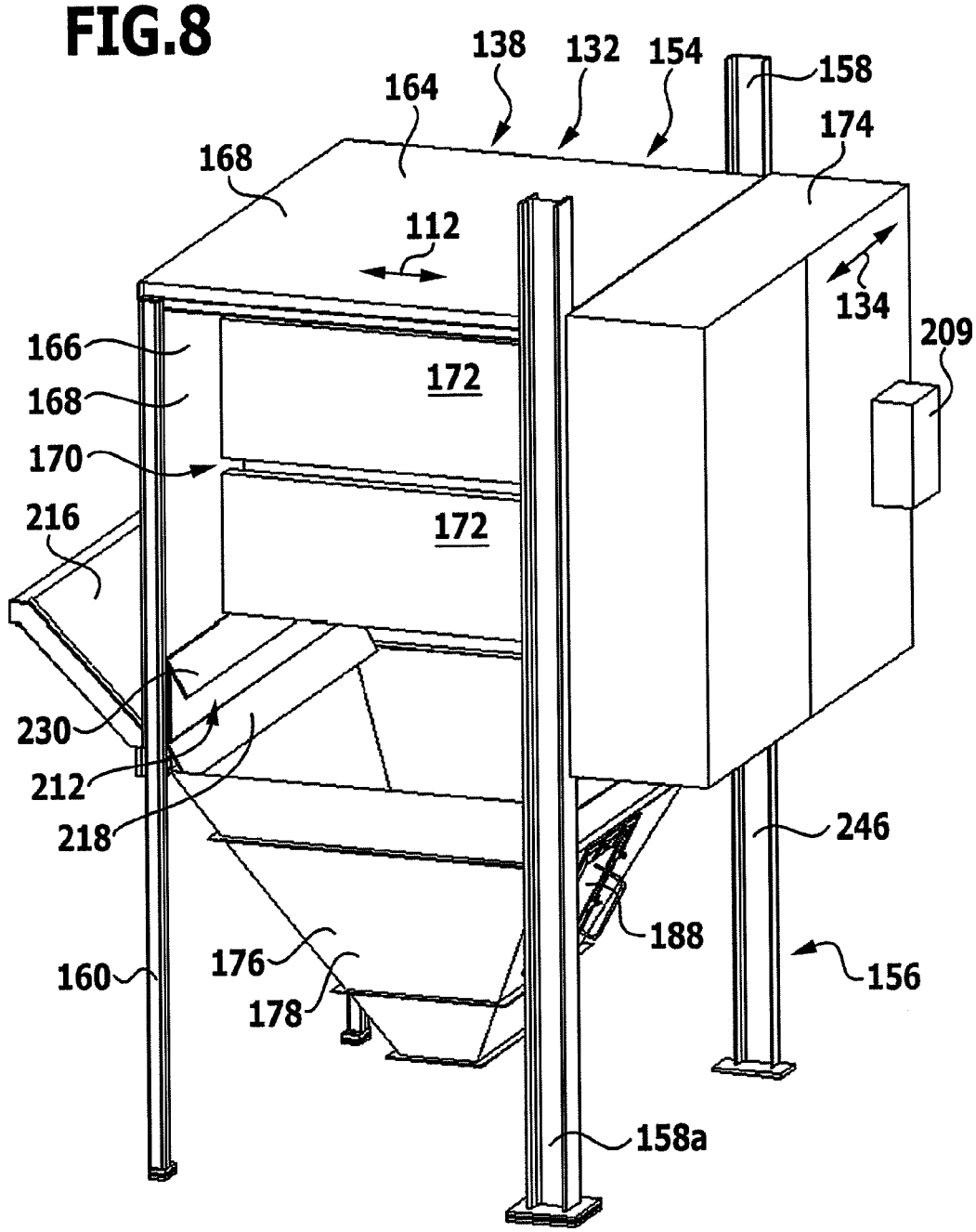
FIG. 8 shows a schematic perspective illustration of a single filter module which is provided for arrangement next to an additional filter module and forms one end of a row of filter modules on the oppositely located side (corner module)

As is apparent from FIG. 8, each corner module 138 has only one rear support 158 which is designed as a connecting element 246 and has a U-shaped profile; the oppositely located rear support 158*a*, which need not be connected either to an adjacent filter module 132 or to an adjacent transverse dividing wall 142, can have, for example, a T-shaped profile instead of a U-shaped profile for increasing its mechanical strength.

As for the rest, the corner modules 138 correspond to the central modules 140 described in detail above with respect to construction and function.

During operation of each filter module 132, the stream 120 of crude gas sweeps over the filter surfaces of the filter elements 172, wherein both the auxiliary material carried along and the wet paint overspray carried along will be deposited on the filter surfaces and the filtered crude gas passes as a stream of exhaust air through the porous filter surfaces into the interior spaces of the filter elements 172 which are connected to a cavity within the base member 174, from which the filter elements 172 project. The cleaned stream of exhaust air passes from this cavity into a respective pipe 248 for exhaust air which leads from the base member 174 of the filter elements 172 of each filter module 132 to a channel 250 for exhaust air which is arranged approximately centrally under the flow chamber 128 and extends parallel to the longitudinal direction 134 of the flow chamber 128 (cf., in particular, FIGS. 2 and 3).

As is apparent from the schematic illustration of FIG. 19, the exhaust air cleaned of the wet paint overspray passes out of the channel 250 for exhaust air to a blower 252 for exhaust air, from where the cleaned exhaust air is supplied via a cooling apparatus (not illustrated) and a supply line (not illustrated) to an air chamber (not illustrated), the so-called plenum, which is arranged above the application area 108.

The cleaned exhaust air passes from this air chamber via a filter cover back into the application area 108.

A line for exhaust air (not illustrated) branches off the supply line and part of the cleaned stream of exhaust air will be discharged to the surroundings through this line for exhaust air (for example, via a chimney).

This part of the stream of exhaust air which is discharged to the surroundings will be replaced by fresh air which is fed into the flow chamber 128 via two devices 254 for generating curtains of air which are each connected to an incoming air system (not illustrated) via a line for incoming air 256 (FIGS. 1 to 3).

Each of the devices 254 for generating curtains of air comprises a respective chamber for incoming air which extends in the longitudinal direction 134 of the flow chamber 128 and is fed with incoming air via the line 256 for incoming air and via a gap 258 which extends along the longitudinal direction 134, has in a vertical direction an extension in the range of, for example, approximately 15 cm to approximately 50 cm and opens into an upper section 260 of the flow chamber 128 which is limited upwards by the application area 108 and downwards by the ceiling walls 164 of the filter modules 132.

The gap 258 of each chamber for incoming air is arranged just above the ceiling walls 164 of the filter modules 132 so that a curtain of air is formed at the upper side of the respective filter modules 132 as a result of the incoming air from the chambers for incoming air flowing into the flow chamber 128 in an essentially horizontal direction along the upper sides of the ceiling walls 164 of the filter modules 132, the curtain of air being directed from the respectively associated device 254 for generating curtains of air to a narrow point 262 between the upper edges of the rows 136 of modules which are located opposite one another and thereby preventing the stream 120 of crude gas laden with wet paint overspray from passing out of the application area 108 to the upper side of the filter modules 132 and the wet paint overspray from the stream 120 of crude gas from being deposited on the upper side of the filter modules 132.

At the narrow point 262 of the flow chamber 128, the horizontal cross section of the flow chamber 128 which has the stream of crude gas flowing through it decreases suddenly so that the flow velocity of the stream of crude gas in the lower section 263 of the flow chamber 128 located beneath the narrow point 262 is considerably greater than in the upper section 260 of the flow chamber 128 located above the narrow point 262.

The average flow direction of the air in the transverse curtains of air generated by the devices 254 for generating curtains of air at the upper side of the filter modules 132 is illustrated in FIG. 3 by the arrows 264.

The majority of the air conveyed through the application area 108 is, therefore, guided in a circuit of circulating air which comprises the application area 108, the flow chamber 128, the filter modules 132, the pipes 248 for exhaust air, the channel 250 for exhaust air, the blower 252 for exhaust air as well as the supply line and the air chamber over the application area 108, wherein a constant heating up of the air guided in the circuit of circulating air is avoided as a result of the supply of fresh air via the devices 254 for generating curtains of air.

Since the separation of the wet paint overspray from the stream 120 of crude gas by means of the filter elements 172 is done in a dry manner, i.e., without any washing out with a cleaning liquid, the air guided in the circuit of circulating air will not be moistened during the separation of the wet paint overspray and so no devices whatsoever for dehumidifying the air guided in the circuit of circulating air are necessary.

Furthermore, no devices are again required for separating wet paint overspray from any wash-out cleaning liquid.

As a result of the fact that the horizontal cross section of the flow chamber 128, which has the stream of crude gas flowing through it, is considerably smaller in the lower section 263 of the flow chamber 128 located beneath the narrow point 262 than in the upper section 260 of the flow chamber 128 due to the presence of the filter modules 132 (in the lower section 263, for example, it is only approximately 35% to approximately 50% of the horizontal cross sectional surface area of the flow chamber 128 in the upper section 260 thereof), the flow velocity of the stream of crude gas will be continuously increased on its way from the application area 108 through the flow chamber 128 to the inlet openings 212 of the filter modules 132 and so an ascending velocity profile will result in the stream of crude gas.

This ascending velocity profile has the effect that particles exiting from the filter modules 132 cannot reach the application area 108.

In this respect, the velocity of the flow of crude gas in the application area 108 and in the upper section 260 of the flow chamber 128 is, for example, up to approximately 0.6 m/s whereas in the lower section 263 of the flow chamber it is, for example, in the range of approximately 0.6 m/s to approximately 3 m/s and increases in the inlet openings 212 of the filter modules 132 up to a maximum value in the range of approximately 3 m/s to approximately 5 m/s.

As a result of the fact that the filter elements 172 in the filter modules 132 are completely enclosed, activation of the filter elements 172 by applying auxiliary material and cleaning of the filter elements 172 are possible at any time while the painting process is running in the application area 108.

If the width of the painting booth 110, i.e., its extension in the transverse direction 112, is altered, filter modules 132 of the same size are, nevertheless, used; the adaptation of the device 126 for separating wet paint overspray takes place, in this case, merely by way of an increase in the distance of the two rows 136 of modules from one another and by way of an increase in the width of the walkable catwalk 146.

The velocity profile of the flow of crude gas therefore alters with such a widening of the painting booth 110 only in the area up to the walkable catwalk 146; from here, i.e., in particular when passing through the inlet openings 212 of the filter modules 132, the velocity profile of the flow of crude gas is dependent only on the amount of crude gas flowing through per unit of time but not on the geometry of the flow chamber 128.

The distance of the (walkable) ceiling walls 164 of the filter modules 132 from the lower edge of the vehicle bodies 102 conveyed through the painting booth 110 is at least approximately 1.5 m for reasons of maintenance.

The filter elements 172 will be cleaned by pulses of compressed air at specific time intervals when their load of wet paint overspray and auxiliary material has reached a predetermined quantity.

This cleaning can take place (as a function of the increase in pressure loss at the filter elements 172), for example, one to six times per 8 hour work shift, i.e., approximately every 1 to 8 hours.

The necessary pulses of compressed air are generated by means of a pulsing unit 266 which is arranged on the base member 174 of the filter elements 172 of each filter module 132, wherein the pulsing unit 266 is in a position to discharge pulses of compressed air to pipes for compressed air which extend within the respective base member 174 and lead from the pulsing unit 266 into the interior spaces of the filter elements 172 (FIG. 19).

The pulses of compressed air pass from the interior spaces of the filter elements 172 through the porous filter surfaces into the filter element chamber 170, wherein the barrier layers consisting of auxiliary material formed on the filter surfaces and the wet paint overspray deposited thereon will be released from the filter surfaces so that the filter surfaces are returned to their cleaned original state.

The pulsing unit 266 comprises a pulsing valve 268, via which the pulsing unit 266 can be supplied with compressed air from a supply line 270 for compressed air which is fed from a compressor 272 (cf. FIG. 19).

The pipe 196 for compressed air, which leads to the exit nozzles 200 of the whirling device 198, is also connected to this supply line 270 for compressed air via a valve 274 for compressed air.

Furthermore, the fluid base 184 of each receptacle 176 for auxiliary material is also connected to the supply line 270 for compressed air via a line 278 for compressed air which is provided with a valve 276 for compressed air.

As a result of the pulsing valve 268 of the valve 274 for compressed air or of the valve 276 for compressed air being opened, cleaning of the filter elements 172, whirling up of the auxiliary material in the receptacle 176 for auxiliary material or a fluidization of the auxiliary material in the receptacle 176 for auxiliary material can, therefore, be triggered, alternatingly or at the same time, by means of the fluid base 184.

A check valve 280, which can be activated by the control device 210 in the local control station, is arranged in the supply line 270 for compressed air between the specified valves for compressed air and the compressor 272.

The control device 210 blocks the supply of compressed air from the compressor 272 to the specified compressed air users of a filter module 132 or of all the filter modules 132 by closing the check valve 280 when it ascertains that no adequate flow of crude gas through the filter elements 172 is present.

In order to ascertain whether an adequate flow of crude gas through the filter elements 172 is present, it may, for example, be provided for the control device 210 to monitor the operating state of the blower 252 for exhaust air.

This monitoring of the operating state of the blower 252 for exhaust air can be brought about, for example, by means of a differential pressure meter (PDIA) 282 which measures the drop in pressure between the pressure side and the suction side of the blower 252 for exhaust air.

Alternatively or in addition hereto, the operating state of the blower 252 for exhaust air can also be monitored by the control device 210 by means of a voltage monitoring device (ESA) 284 and/or by means of a frequency converter (SC) 286.

Furthermore, it may be provided for the absence of an adequate flow of crude gas through the filter elements 172 to be determined by means of a flow meter (FIA) 288 which measures the flow of gas through the channel 250 for exhaust air or through one or more of the pipes 248 for exhaust air.

Furthermore, it is possible to ascertain the absence of an adequate flow of crude gas through the filter elements 172 by measuring the drop in pressure at the filter elements 172 of a filter module 132 or of all the filter modules 132.

When the control device 210 ascertains, on account of the signals transmitted to it from the differential pressure meter 282, the voltage monitoring device 284, the frequency converter 286 and/or the flow meter 288, that the flow of crude gas through the filter elements 172 is below a predetermined threshold value, the supply of compressed air will be blocked to at least one of the filter modules 132 by closure of the check valve 280.

In this way, auxiliary material is prevented from passing into the flow path of the crude gas and, in particular, through the inlet opening 212 of a filter module 132 into the flow chamber 128 and from there into the application area 108 as a result of whirling up by means of the whirling unit 198, as a result of cleaning of the filter elements 172 or as a result of fluidization of the supply of auxiliary material in the receptacle 176 for auxiliary material.

This blocking of the supply of compressed air can take place for all the filter modules 132 together or for the individual filter modules 132 separately from one another. In the latter case, the determination of the absence of an adequate flow of crude gas through the filter elements 172 takes place for each of the filter modules 132 separately and either each filter module 132 is provided with its own compressor 272 or the supply lines 270 for compressed air to the individual filter modules 132 can be blocked or released individually via check valves 280 which can be switched separately from one another.

The auxiliary material will be supplied to the stream of crude gas, in the case of the device 126 for separating wet paint overspray described above, exclusively within the filter modules 132 by the auxiliary material in the respective receptacle 176 for auxiliary material being whirled up.

Figure 17:
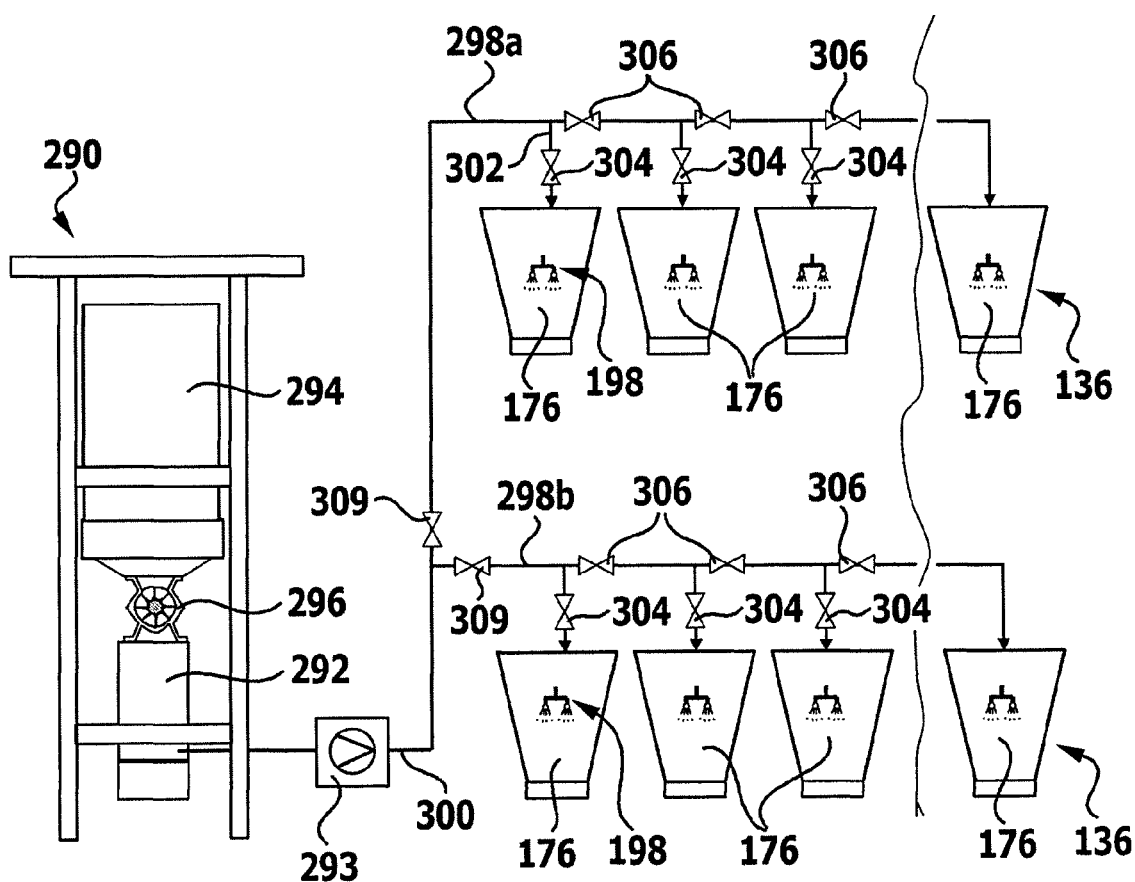
FIG. 17 shows a schematic illustration of a device for supplying fresh auxiliary material from a storage receptacle to receptacles for auxiliary material of the type illustrated in FIG. 13 which are in their operating position.

In order to be able to supply fresh auxiliary material to the receptacles 176 for auxiliary material which are rigidly mounted within the filter modules 132 in their operating position, the device 126 for separating wet paint overspray comprises a supply device 290 for auxiliary material which is illustrated schematically in FIG. 17 and comprises a storage receptacle 292 which can be designed as a blow pot or as a simple fluidization receptacle.

Blow pots are known per se, for example, from JP 02123025 A or JP 06278868 A and have previously been used in coating plants for the purpose of conveying powdered paint to the application receptacles located in the vicinity of the sprayers. The receptacles are relatively small, closable containers with a base permeable to air, through which air is conveyed into the container for fluidizing the powder and for its conveyance.

While a blow pot can be emptied as a result of the pressure of the fluidizing air, the fluidizing receptacle will have a powder metering pump 293 connected to its outlet for the conveyance of material (cf. FIG. 1), such as, for example, the so-called DDF pump described in WO 03/024612 A1 or another metering pump conveying with suction/pressure alternation in accordance with the principle of a dense flow, such as, for example, those known from EP 1 427 536 B1, WO 2004/087331 A1 or from FIG. 3 of DE 101 30 173 A1.

For the purpose of filling the storage receptacle 292, a larger supply receptacle (container or "big bag") 294 for the fresh auxiliary material is arranged above it and the material can, in the simplest case, trickle from it through an opening in the storage receptacle (silo) 292 which can be closed by a flap. In order to be able to continuously refill the storage receptacle 292 even during conveyance of the material and to avoid any losses in time during operation, a mechanical conveying device 246, for example, a rotary vane feeder or a conveying worm, is preferably arranged between the supply receptacle 294 and the storage receptacle 292. When such a conveying device is used, a desired filling quantity can also be advantageously set, in the case of a rotary vane feeder via the filling quantity per cell which is determined beforehand.

The storage receptacle 292 is connected to each of the receptacles 176 for auxiliary material via a main line 300 which is divided into two branches 298*a*, 298*b* and from which stub lines 302 lead each time to one of the receptacles 176 for auxiliary material. In this respect, each of the branches 298*a*, 298*b* of the main line 300 leads each time to the receptacles 176 for auxiliary material of one row 136 of modules.

The main line 300 preferably consists of flexible hoses.

For this purpose, hoses with an internal diameter of up to approximately 14 mm, in particular from approximately 6 mm to approximately 12 mm, can be used.

The stub lines 302 can be of a tubular design and are each provided with a mechanical pinch valve 304, wherein a second pinch valve 306 is arranged each time behind the branch-off of the respective stub line 302 in the direction of flow of the auxiliary material.

Additional pinch valves 309 are arranged at the branch-off of the two branches 298*a*, 298*b* of the main line 300 in order to be able to open or close these two branches 298*a*, 298*b* as required.

During operation of the supply device 290 for auxiliary material, the main line 300 and all the stub lines 302 are, first of all, empty. When a specific receptacle 176 for auxiliary material is intended to be supplied with fresh auxiliary material, the main line will be blocked behind the branch-off point of the associated stub line 302 by closing the respectively associated pinch valve 306, the relevant stub line 302 opened by opening the associated pinch valve 304 and, subsequently, the auxiliary material from the storage receptacle 292 conveyed to the relevant receptacle 176 for auxiliary material.

Subsequently, the line path described above to the relevant receptacle 176 for auxiliary material will be emptied and flushed cleaned. This offers the advantage that the batch quantity is always determined and can be metered exactly and that the line path cannot be blocked since flush cleaning always takes place into the supplied receptacle 176 for auxiliary material.

Each of the stub lines 302 opens into one of the side walls 178 of the respectively associated receptacle 176 for auxiliary material, preferably in an area close to the upper edge of the receptacle 176 for auxiliary material, so that as large an amount of auxiliary material as possible can be supplied through the stub line 302.

The stub line 302, which leads to the respectively last receptacle 176 for auxiliary material of a row 136 of modules, does not require any pinch valve arrangement since it is merely necessary for all the pinch valves 306 and 309 arranged in the main line 300 downstream of the last receptacle 176 for auxiliary material to be opened for supplying this receptacle 176 for auxiliary material.

Instead of the pinch valve arrangements described above, mechanical pinch shunts or other types of powder shunts which are known per se from the state of the art can also be provided at the branches of the line system for auxiliary material.

Figure 18:
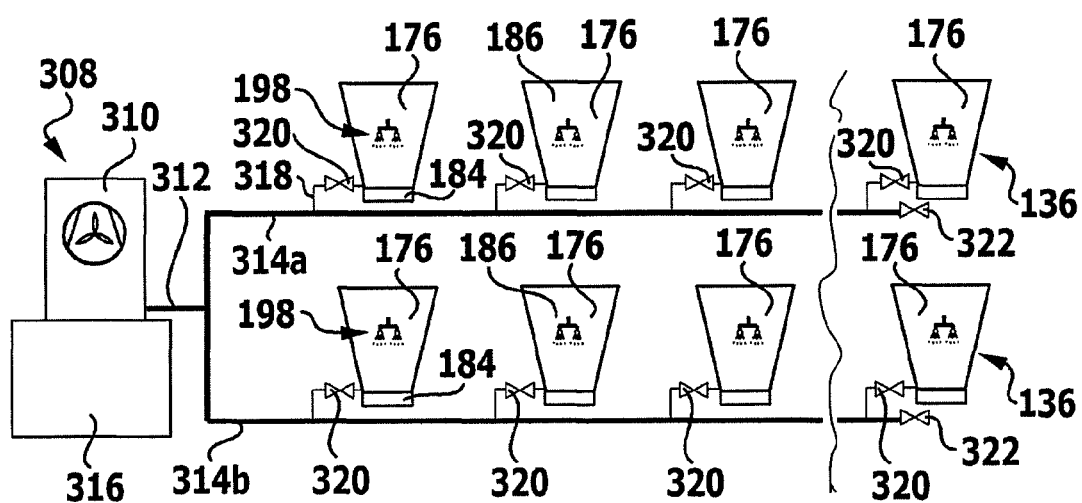
FIG. 18 shows a schematic illustration of a discharge device for discharging auxiliary material mixed with overspray from the receptacles for auxiliary material to a collecting receptacle.

In order to be able to remove the auxiliary material mixed with overspray, which has collected in a receptacle 176 for auxiliary material, and supply it for waste disposal or further use prior to fresh auxiliary material being supplied to the receptacle 176 for auxiliary material, the device 126 for separating wet paint overspray comprises, in addition, a discharge device 308 for auxiliary material which is illustrated schematically in FIG. 18.

The discharge device 308 for auxiliary material comprises, for its part, a suction blower 310, for example, a dust exhaust blower which conveys used auxiliary material from a main line 312, which branches into two branches 314a, 314b, into a collecting receptacle 316 arranged beneath the suction blower 310.

Each respective one of the branches 314a, 314b of the main line 312 leads to the receptacles 176 for auxiliary material of one row 136 of modules and is connected to each of the receptacles 176 for auxiliary material of the relevant row 136 of modules via a respective stub line 318 which can be closed by means of a pinch valve 320.

A respective ball valve 322 is arranged at the end of each branch 314a, 314b of the main line 312 and conveying air can be supplied to the main line 312 through the ball valve as required in order to make the removal of the auxiliary material by suction from the main line 312 to the suction blower 310 easier.

The stub lines 318 each open into the interior space 186 of the respective receptacle 176 for auxiliary material just above the fluid base 184, preferably in a corner area of the receptacle 176 for auxiliary material, in which two side walls 178 adjoin one another.

It is particularly favorable for an efficient and as complete a removal by suction as possible of the used auxiliary material from a receptacle 176 for auxiliary material, when the stub line 318 branches into two suction lines, each of which opens into the interior space 186 of the receptacle 176 for auxiliary material at a different corner area.

When a specific receptacle 176 for auxiliary material is intended to be emptied of used auxiliary material mixed with overspray, the pinch valve 320 of the respectively associated stub line 318 will be opened for this purpose and the material present in the receptacle 176 for auxiliary material will be sucked through the stub line 318 and the main line 312 by means of the suction blower 310 and conveyed to the collecting receptacle 316.

The suction process is terminated by closing the respectively associated pinch valve 320.

During the suction process, the fluid base 184 of the relevant receptacle 176 for auxiliary material is permanently in operation, i.e., has compressed air flowing through it during the entire suction process in order to fluidize the material to be withdrawn by suction and cause it to flow easily.

Furthermore, the withdrawal of the used material by suction from the receptacle 176 for auxiliary material can be aided in that during the suction process the whirling device 198 of the relevant receptacle 176 for auxiliary material is in operation continuously or at regular intervals (for example, 6×5 seconds per minute) because the material will be loosened and moved towards the inlet openings of the stub line 318 when the material to be withdrawn by suction is acted upon with compressed air from above through the exit nozzles 200 of the whirling device 198.

If the withdrawal of the used auxiliary material by suction from one of the receptacles 176 for auxiliary material does not function perfectly, which becomes apparent from the fact that the associated filling level sensor 204 reports a filling level which is no longer sinking, the operation of the device 126 for separating wet paint overspray need not be interrupted. On the contrary, auxiliary material can, instead, be withdrawn by suction from another receptacle 176 for auxiliary material which is connected to the same branch 314a or 314b of the main line 312. As a result, the blocking of the transport of material out of the blocked receptacle 176 for auxiliary material can, in many cases, be rectified and so, subsequently, the material can be withdrawn by suction from the receptacle 176 for auxiliary material which was previously blocked.

The material removed from the receptacle 176 for auxiliary material by suction, which contains auxiliary material together with overspray particles, can either be disposed of or—where applicable following processing—used again at least partially in the coating plant.

Furthermore, it may be provided for the substances of the auxiliary material to be selected such that they can be utilized for other purposes than for the coating of workpieces after their use in the coating plant. For example, the used auxiliary material can be used as insulating material or, for example, be thermally exploited in the brick or cement industry or the like, wherein the wet paint overspray bonded to the auxiliary material can likewise be used as an energy carrier during a combustion process required for production.

Once the used auxiliary material has been withdrawn by suction from a receptacle 176 for auxiliary material, the same can be filled with fresh auxiliary material by means of the supply device 290 for auxiliary material already described above, namely, for example, up to a first filling level of approximately 50% of the entire capacity of the receptacle 176 for auxiliary material.

As a result of the accumulation of wet paint overspray, which has a lower density than the auxiliary material, in the mixture consisting of auxiliary material and overspray, which is present in the receptacle 176 for auxiliary material, the density of this mixture decreases ever further during operation of a filter module 132 and so the barrier layer which is built up on the filter elements 172 of the filter module 132 has an ever greater volume.

The filling level of the material in the receptacle 176 for auxiliary material immediately prior to a cleaning procedure for the filter elements 172 therefore decreases ever further.

In the case of a predetermined residual filling level which corresponds, for example, to approximately 10% of the capacity of the receptacle 176 for auxiliary material, the auxiliary material mixed with overspray will be withdrawn from the receptacle 176 for auxiliary material by suction, as described above. As a result of this withdrawal by suction prior to a cleaning procedure for the filter elements 172, it is possible for mainly the material which has become unusable, has collected in the receptacle 176 for auxiliary material and does not form the barrier layer on the filter elements 172 to be removed from the receptacle 176 for auxiliary material.

Alternatively to this procedure, it may also be provided for the filling level of the material in the receptacle 176 for auxiliary material to be measured after each cleaning procedure of the filter elements 172 of the filter module 132 and for a suction process to be initiated when a predetermined maximum filling level, for example, 90% of the maximum capacity of the receptacle 176 for auxiliary material is reached.

In any case, the filling level of the material in the receptacle 176 for auxiliary material which triggers a suction process will be determined by means of the filling level sensor 204 which is arranged in the respective receptacle 176 for auxiliary material.

Figure 20:
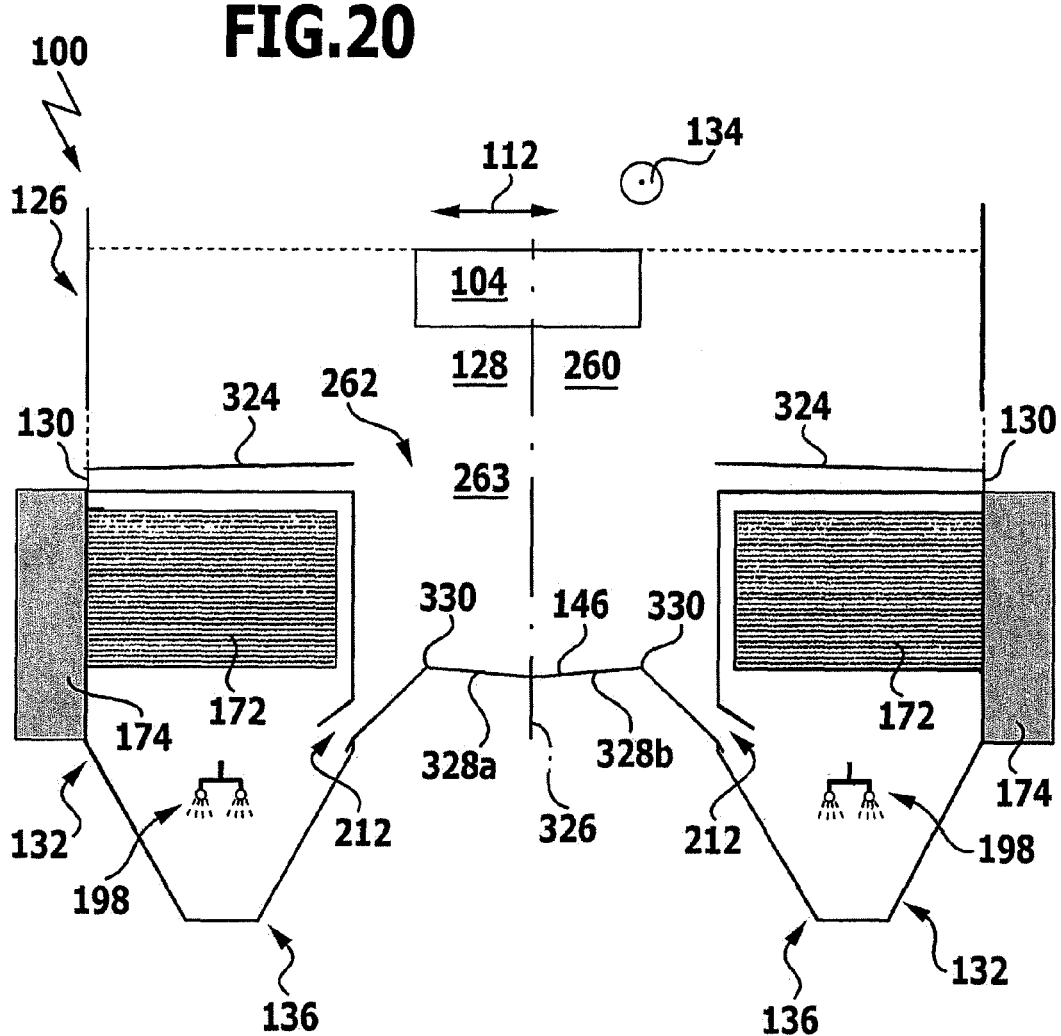
FIG. 20 shows a schematic vertical cross section through a second embodiment of a device for separating wet paint overspray from a stream of exhaust air containing overspray particles, the device comprising inclined flow guide plates for guiding a transverse stream of air and a walkable catwalk with an inclined upper side between the filter modules.

A second embodiment of a plant 100 for painting vehicle bodies 102, which is illustrated in FIG. 20 in a schematic cross section, differs from the first embodiment described above in that separate guide plates 324 for transverse curtains of air are arranged above the filter modules 132 and serve the purpose of conducting the air supplied by the devices 254 for generating the curtains of air to the narrow point 262 between the upper section 260 and the lower section 263 of the flow chamber 128.

These guide plates 324 for transverse curtains of air are inclined in relation to the respectively adjacent side wall 130 of the flow chamber 128 at an angle of, for example, approximately 1° to approximately 3° in relation to the horizontal so that liquid reaching the guide plates 324 for the transverse curtains of air from above will flow away to the side walls 130, not to the narrow point 262.

In this way, it is ensured that, for example, paint flowing out of the application area 108 on account of a burst hose or water for extinguishing fires cannot pass into the lower section 263 of the flow chamber 128 and from there into the filter modules 132 but rather can flow away to the sides of the flow chamber 128.

Furthermore, the walkable catwalk 146 between the rows 136 of modules is divided in this embodiment into two halves 328a, 328b which are essentially mirror symmetric to a vertical longitudinal central plane 326 of the flow chamber 128 and are inclined in relation to the longitudinal central plane 326 at a respective angle of, for example, approximately 1° to, for example, approximately 3° in relation to the horizontal so that liquid passing onto the walkable catwalk 146 from above, such as, for example, paint or water for extinguishing fires, cannot pass over the side edges 330 of the walkable catwalk 146 to the inlet openings 212 of the filter modules 132 but is rather retained in the center of the walkable catwalk 146.

Both the walkable catwalk 146 and the guide plates 324 for the transverse curtains of air can, in addition, be inclined in the longitudinal direction 134 of the flow chamber 128 in relation to the horizontal so that the liquid located on these elements can flow away to an outflow opening on account of the effect of gravity.

As for the rest, the second embodiment of a plant 100 for painting vehicle bodies 102, as illustrated in FIG. 20, corresponds with respect to construction and functioning to the first embodiment illustrated in FIGS. 1 to 19, to the above description of which reference is made in this respect.

Figure 21:
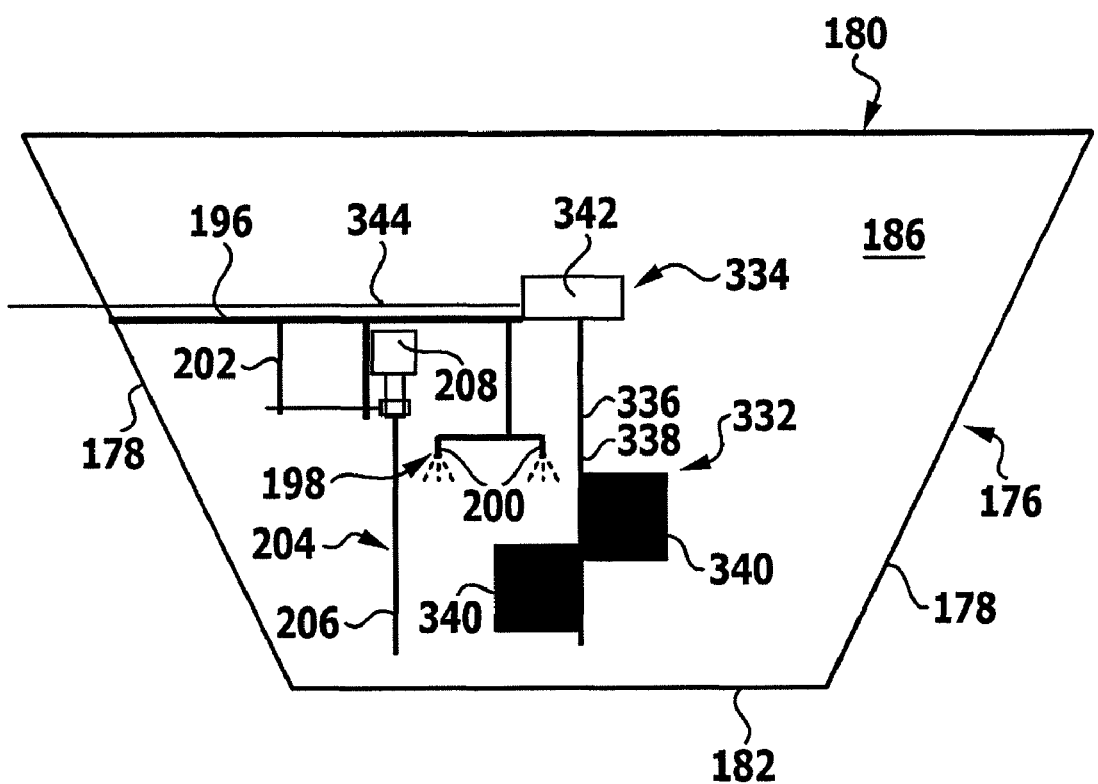
FIG. 21 shows a schematic vertical cross section through an alternative embodiment of a receptacle for auxiliary material which is provided with a pneumatically driven mixing apparatus for thoroughly mixing the material located in the receptacle for auxiliary material and for homogenizing the supply.
Figure 22:
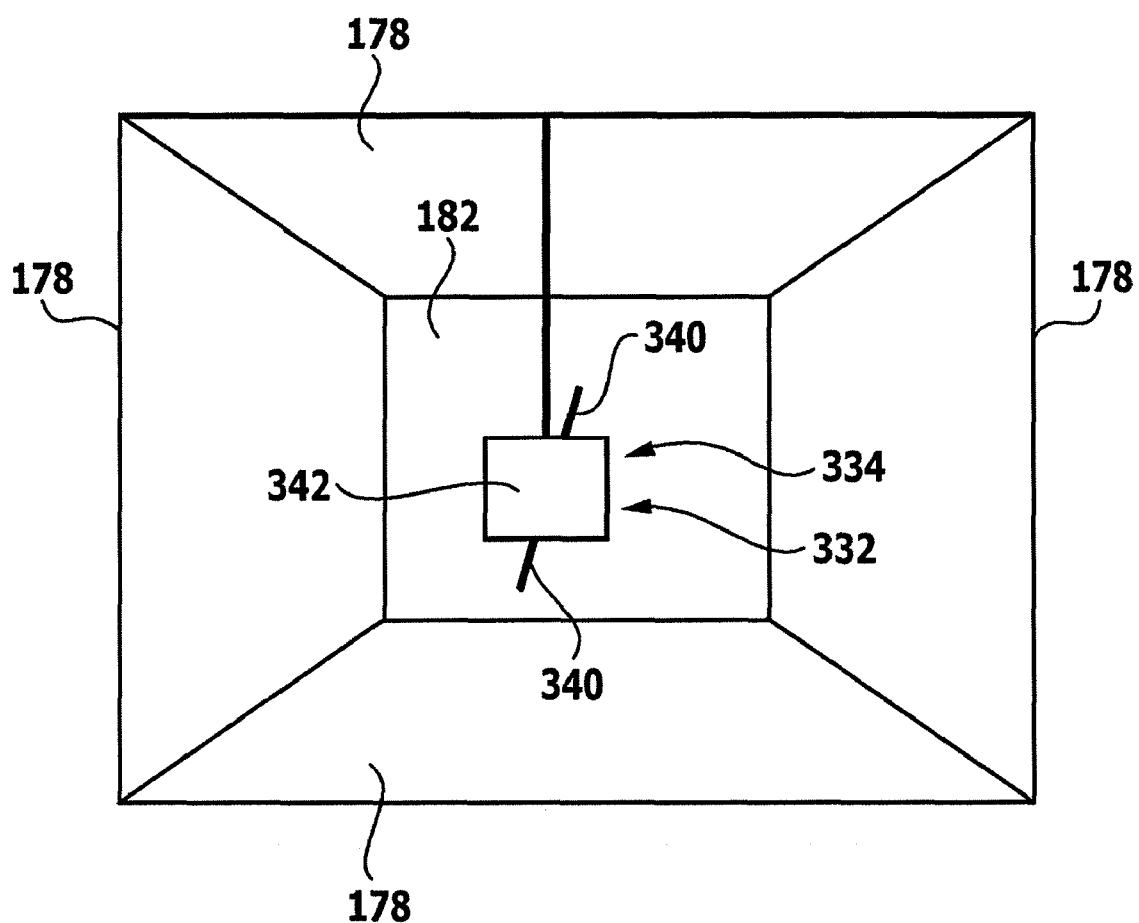
FIG. 22 shows a schematic plan view from above of the receptacle for auxiliary material with a pneumatically driven mixing apparatus from FIG. 21.

The receptacles 176 for auxiliary material of the filter modules 132 of the plants 100 for painting vehicle bodies 102 described above can, alternatively or in addition to the fluid base 184 illustrated in FIG. 13, also have other devices 332 for thoroughly mixing the material located in the receptacle 176 for auxiliary material, for example, a pneumatically operated stirring apparatus 334 which is illustrated schematically in FIGS. 21 and 22.

The pneumatically operated stirring apparatus 334 comprises a stirrer 336 with at least two stirring paddles 340 which are arranged non-rotatably on a stirrer shaft 338 which is aligned essentially vertically and a stirrer turbine 342 which is illustrated merely schematically in FIGS. 21 and 22 and by means of which the stirrer shaft 338 can be driven to perform a rotary movement about its vertical axis.

The stirring paddles 340 are arranged on the stirrer shaft 338 so as to be offset relative to one another in the axial direction of the stirrer shaft 338 and at an angular distance of, for example, approximately 180°.

The stirrer turbine 342 can be supplied with compressed air via a supply line 344 for compressed air.

If the stirrer turbine 342 is supplied with compressed air via the supply line 344 for compressed air, the compressed air supplied causes the stirrer turbine 342 to perform a rotary movement about its vertical axis, whereupon the stirrer shaft 338, which is connected non-rotatably to the stirrer turbine 342, is likewise caused to move.

In this respect, the material located in the receptacle 176 for auxiliary material will be thoroughly mixed as a result of the rotating stirring paddles 340 and the surface of the material located in the receptacle 176 for auxiliary material will be smoothed. Bridges of material formed in the receptacle 176 for auxiliary material as a result of undermining will be broken up.

In this way, a good mixing through of the material in the receptacle 176 for auxiliary material and a homogenization of the filling level of the material within the receptacle 176 for auxiliary material will be achieved.

Any formation of sparks within the receptacle 176 for auxiliary material will be avoided and an adequate protection against explosion ensured by the pneumatic drive for the stirring apparatus 334.

Figure 23:
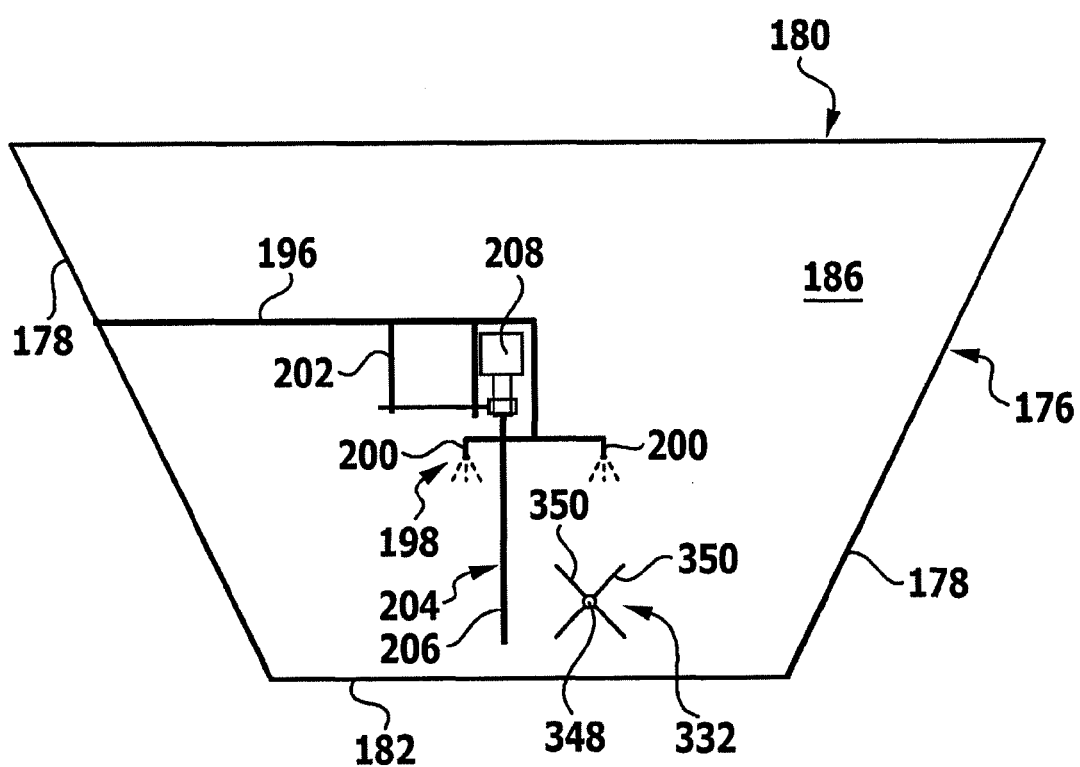
FIG. 23 shows a schematic vertical section through an additional, alternative embodiment of a receptacle for auxiliary material which is provided with an electrically driven shaft and paddles for thoroughly mixing the material located in the receptacle for auxiliary material and for homogenizing the supply.
Figure 24:
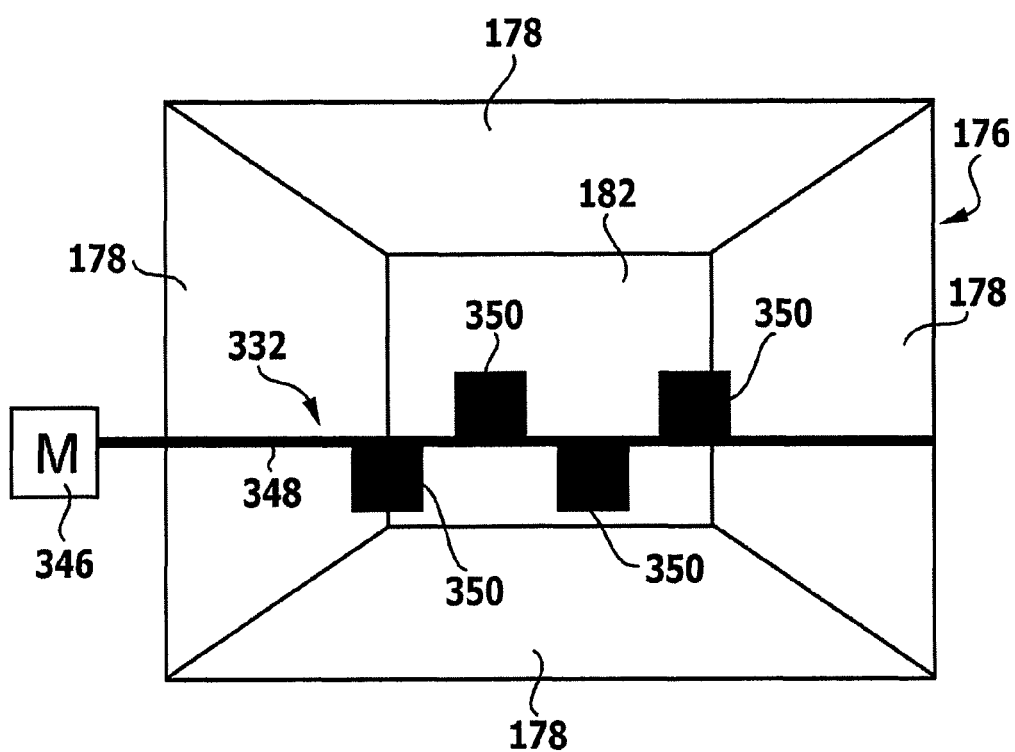
FIG. 24 shows a schematic plan view from above of the receptacle for auxiliary material with an electrically driven shaft from FIG. 23.

An alternative embodiment of a device 332 for thoroughly mixing the material located in the receptacle 176 for auxiliary material, illustrated in FIGS. 23 and 24, comprises an electric motor 346 which is arranged to the side next to the receptacle 176 for auxiliary material and the driven shaft 348 of which is guided through a side wall 178 of the receptacle 176 for auxiliary material and provided with several, for example, four paddles 350 which are arranged non-rotatably on the driven shaft 348 and so as to be offset relative to one another at a respective angular distance of, for example, approximately 90° as well as in the axial direction of the driven shaft 348.

As a result of rotation of the driven shaft 348 by means of the electric motor 346 about its axis which is aligned essentially horizontally, the paddles 350 are caused to perform a rotary movement, whereby the paddles 350 thoroughly mix the material located in the receptacle 176 for auxiliary material and smooth its surface as well as break up bridges of material resulting in the receptacle 176 for auxiliary material.

The refitting of an already existing device 126 for separating wet paint overspray from a stream of crude gas containing overspray particles can take place in the following manner with use of the filter modules 132 of the plants 100 described above:

First of all, part of the existing device will be dismantled so that the space required by a filter module 132 in its operating position will be opened up.

Subsequently, a filter module 132 will be arranged in the operating position freed up in this manner and connected to the support construction for the application area 108, in particular to the booth walls 114 of the painting booth 110.

Subsequently, these steps will be repeated until all the filter modules 132 are arranged in their operating positions and are connected to the support construction for the application area 108.

In this way, an existing device for the wet separation of wet paint overspray can, for example, be replaced by the device 126 for the dry separation of wet paint overspray which is described above and is of a modular construction without it being necessary for this purpose to dismantle the application area 108 of the plant 100 for painting vehicle bodies 102.

The invention claimed is:
1. Method for supplying fresh auxiliary material to at least one filter device comprising at least one receptacle for auxiliary material, comprising:
adding a particulate auxiliary material to a stream of crude gas laden with wet paint overspray;
passing the stream of crude gas through the at least one filter element for separating the wet paint overspray from the stream of crude gas;

passing a mixture of auxiliary material and wet paint overspray from the at least one filter element into the at least one receptacle for auxiliary material;

wherein said receptacle is in an operating position while the stream of crude gas is passing through the filter element, wherein the fresh auxiliary material is supplied through a supply line for auxiliary material connected to the receptacle for auxiliary material directly into the receptacle for auxiliary material while the receptacle for auxiliary material is in the operating position and wherein auxiliary material mixed with overspray is removed from the at least one receptacle for auxiliary material through a discharge line for auxiliary material connected to the receptacle for auxiliary material and conveyed into a collecting receptacle from the at least one receptacle for auxiliary material.

2. Method as defined in claim 1, wherein the at least one receptacle for auxiliary material is mounted in the operating position so as to be immovable.

3. Method as defined in claim 1, wherein the fresh auxiliary material is conveyed into the at least one receptacle for auxiliary material from at least one storage receptacle.

4. Method as defined in claim 1, wherein at least one discharge line for auxiliary material opens into an interior space of the receptacle for auxiliary material in a corner area of the receptacle for auxiliary material.

5. Method as defined in claim 1, wherein at least two discharge lines for auxiliary material open into an interior space of the receptacle for auxiliary material.

6. Method as defined in claim 1, wherein the auxiliary material mixed with overspray is drawn out of the at least one receptacle for auxiliary material by suction.

7. Method as defined in claim 1, wherein auxiliary material mixed with overspray is removed from at least one receptacle for auxiliary material in order to empty the receptacle for auxiliary material before fresh auxiliary material is supplied to the receptacle for auxiliary material.

8. Method as defined in claim 1, wherein a filling level of the auxiliary material is measured by a filling level sensor arranged in the receptacle for auxiliary material.

9. Method as defined in claim 1, wherein auxiliary material mixed with overspray is removed from at least one receptacle for auxiliary material when a filling level of the auxiliary material in the receptacle for auxiliary material has fallen to a predetermined minimum filling level.

10. Method as defined in claim 1, wherein auxiliary material mixed with overspray is removed from at least one receptacle for auxiliary material when a filling level of the auxiliary material in the receptacle for auxiliary material has risen to a predetermined maximum filling level.

11. Method as defined in claim 10, wherein at least one filter element associated with a receptacle for auxiliary material is cleaned and auxiliary material mixed with overspray is removed from the receptacle for auxiliary material when the a filling level of the auxiliary material in the receptacle for auxiliary material has risen to the predetermined maximum filling level as a result of cleaning.

12. Method as defined in claim 1, wherein the auxiliary material mixed with overspray is fluidized in at least one receptacle for auxiliary material while auxiliary material mixed with overspray is being removed from the receptacle for auxiliary material.

13. Method as defined in claim 1, wherein the auxiliary material in at least one receptacle for auxiliary material is whirled up at least periodically by means of a whirling device while auxiliary material mixed with overspray is being removed from the receptacle for auxiliary material.

14. Method as defined in claim 1, wherein auxiliary material mixed with overspray is removed from the at least one receptacle for auxiliary material when the auxiliary material in the receptacle for auxiliary material reaches a predetermined filling level.

* * * * *